United States Patent
Yoshikawa et al.

(10) Patent No.: US 11,670,764 B2
(45) Date of Patent: Jun. 6, 2023

(54) POSITIVE ELECTRODE, ELECTRODE GROUP AND NONAQUEOUS ELECTROLYTE BATTERY

(71) Applicant: KABUSHIKI KAISHA TOSHIBA, Tokyo (JP)

(72) Inventors: Hikaru Yoshikawa, Kashiwazaki (JP); Akira Yajima, Kashiwazaki (JP); Yasuaki Murashi, Kashiwazaki (JP); Naoki Nishio, Kashiwazaki (JP); Kazuhiro Namba, Chiba (JP); Natsuki Nakamura, Kashiwazaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 320 days.

(21) Appl. No.: 17/019,777

(22) Filed: Sep. 14, 2020

(65) Prior Publication Data

US 2020/0411853 A1 Dec. 31, 2020

Related U.S. Application Data

(63) Continuation of application No. PCT/JP2018/014451, filed on Apr. 4, 2018.

(51) Int. Cl.
*H01M 4/48* (2010.01)
*H01M 4/62* (2006.01)
(Continued)

(52) U.S. Cl.
CPC ........... *H01M 4/481* (2013.01); *H01M 4/364* (2013.01); *H01M 4/483* (2013.01); *H01M 4/624* (2013.01);
(Continued)

(58) Field of Classification Search
CPC ............ H01M 4/48; H01M 4/30; H01M 4/44; H01M 4/16
See application file for complete search history.

(56) References Cited

U.S. PATENT DOCUMENTS

| 2007/0009801 A1 | 1/2007 | Inagaki et al. |
| 2008/0166637 A1* | 7/2008 | Inagaki ................. H01M 4/366 429/231.95 |

(Continued)

FOREIGN PATENT DOCUMENTS

| JP | 2007-018882 A | 1/2007 |
| JP | 2008-243729 A | 10/2008 |

(Continued)

OTHER PUBLICATIONS

International Search Report dated Jun. 5, 2018 in PCT/JP2018/014451 filed on Apr. 4, 2018, 2 pages.

*Primary Examiner* — Kenneth J Douyette
(74) *Attorney, Agent, or Firm* — Maier & Maier, PLLC

(57) ABSTRACT

According to a first embodiment, there is provided a positive electrode including a positive electrode active material-containing layer containing a first active material having a spinel type crystal structure. The positive electrode satisfies the formulas (1) to (3) when combined with a negative electrode including a negative electrode active material-containing layer containing a first active material having a spinel type crystal structure: $0.5 \leq a1/b1 \leq 1.5$ (1); $0.4 \leq a2/b2 \leq 1.4$ (2); and $0.5 \leq a3/b3 \leq 2.3$ (3), where a1 and b1 are a pore volume per 1 g weight, a2 and b2 are a pore specific surface area, and a3 and b3 are a median diameter in pore distribution, for the positive and negative electrode active material-containing layers, respectively.

7 Claims, 3 Drawing Sheets

(51) Int. Cl.
  *H01M 4/36* (2006.01)
  *H01M 50/46* (2021.01)
  *H01M 10/0525* (2010.01)
  *H01M 10/05* (2010.01)
  *H01M 4/02* (2006.01)
  *H01M 50/466* (2021.01)

(52) U.S. Cl.
  CPC ....... *H01M 10/05* (2013.01); *H01M 10/0525* (2013.01); *H01M 50/46* (2021.01); *H01M 50/466* (2021.01); *H01M 2004/021* (2013.01); *H01M 2004/025* (2013.01); *H01M 2004/027* (2013.01); *H01M 2004/028* (2013.01)

(56) References Cited

U.S. PATENT DOCUMENTS

| | | |
|---|---|---|
| 2008/0241692 A1 | 10/2008 | Saruwatari et al. |
| 2010/0119936 A1 | 5/2010 | Inagaki et al. |
| 2011/0020699 A1 | 1/2011 | Inagaki et al. |
| 2011/0229758 A1 | 9/2011 | Inagaki et al. |
| 2012/0141871 A1 | 6/2012 | Inagaki et al. |
| 2012/0270093 A1 | 10/2012 | Isozaki et al. |
| 2013/0040187 A1 | 2/2013 | Inagaki et al. |
| 2013/0273417 A1 | 10/2013 | Inagaki et al. |
| 2013/0280586 A1 | 10/2013 | Isozaki et al. |
| 2013/0330613 A1* | 12/2013 | Saruwatari .......... H01M 10/052 429/211 |
| 2014/0220437 A1 | 8/2014 | Inagaki et al. |
| 2016/0056450 A1 | 2/2016 | Yoshikawa et al. |
| 2016/0240885 A1* | 8/2016 | Nishimura ........ H01M 10/0569 |
| 2019/0027753 A1 | 1/2019 | Ito et al. |

FOREIGN PATENT DOCUMENTS

| | | |
|---|---|---|
| JP | 2010-225366 A | 10/2010 |
| JP | WO2011/108106 A1 | 9/2011 |
| JP | 2015-060656 A | 3/2015 |
| JP | 2016-048671 A | 4/2016 |
| JP | WO2017/122759 A1 | 7/2017 |

* cited by examiner

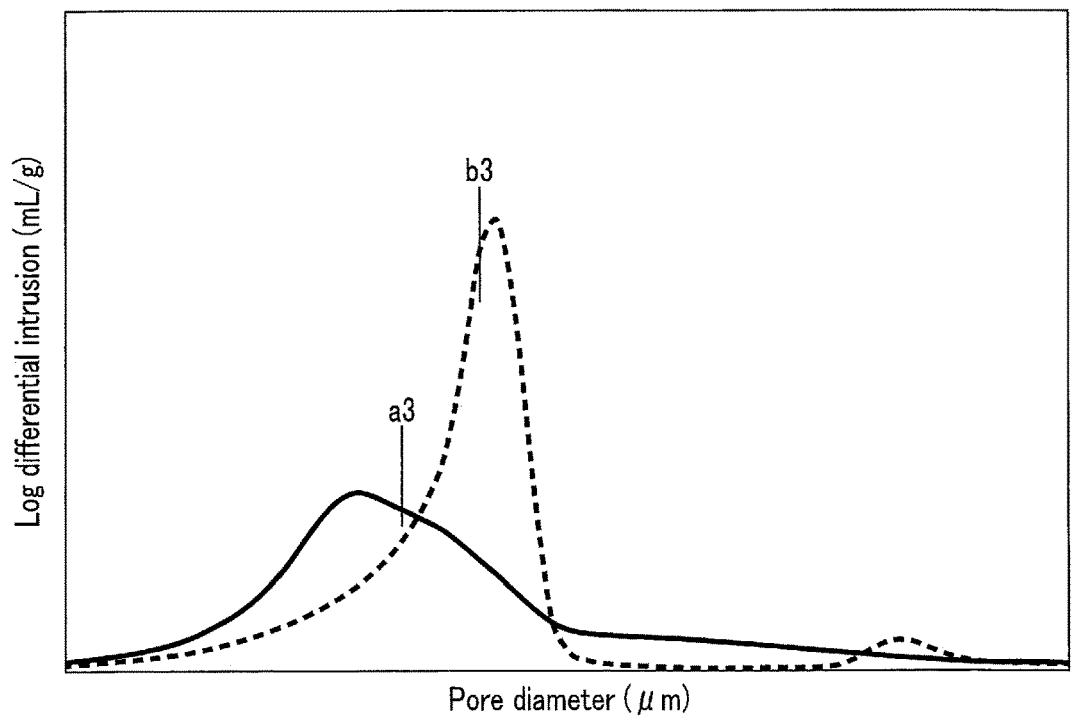
F I G. 5
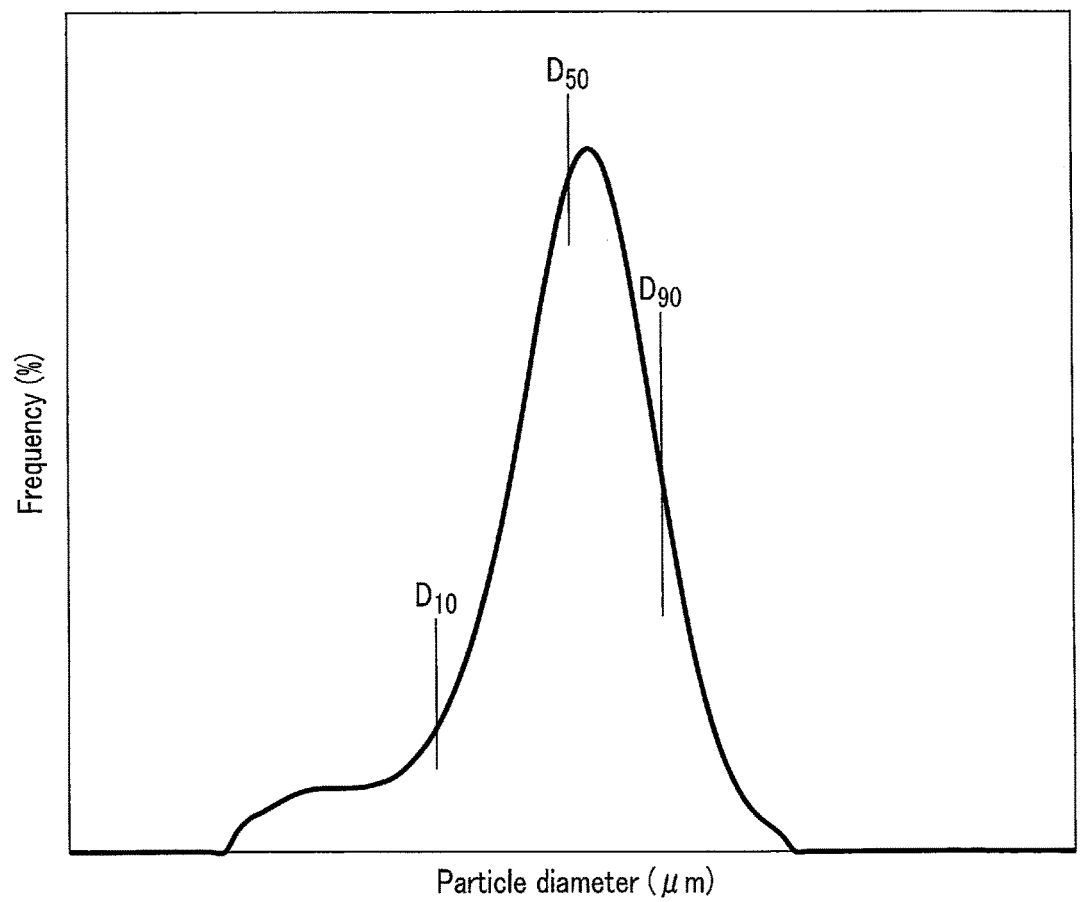
F I G. 6

POSITIVE ELECTRODE, ELECTRODE GROUP AND NONAQUEOUS ELECTROLYTE BATTERY

CROSS-REFERENCE TO RELATED APPLICATION

This application is a Continuation Application of PCT Application No. PCT/JP2018/014451, filed Apr. 4, 2018, the entire contents of which are incorporated herein by reference.

FIELD

Embodiments of the present invention generally relate to a positive electrode, an electrode group and a nonaqueous electrolyte battery.

BACKGROUND

A lithium-ion secondary battery, which is an example of a nonaqueous electrolyte battery, has been introduced and widely used in electronic devices such as smartphones and notebook personal computers, and vehicles such as hybrid vehicles, plug-in hybrid vehicles, and electric vehicles. The lithium ion secondary battery can be produced, for example, by housing an electrode group formed by laminating a positive electrode and a negative electrode with interposing a separator or an electrode group obtained by winding the laminate formed in this way, in a container containing aluminum or an aluminum alloy as a material and injecting an electrolytic solution prepared by dissolving an electrolyte salt containing lithium in a nonaqueous solvent into the container.

Desirably, the lithium-ion secondary battery satisfies, for example, an output performance that can be used at a high current value, a life performance that can be used for a long period, and a large capacity performance that has a high energy density.

BRIEF DESCRIPTION OF THE DRAWINGS

FIG. 5 shows respective pore distributions of a positive electrode active material-containing layer and a negative electrode active material-containing layer produced in Example 1; and FIG. 6 shows a particle size distribution of the positive electrode active material-containing layer produced in Example 1.

DETAILED DESCRIPTION

Figure 1:
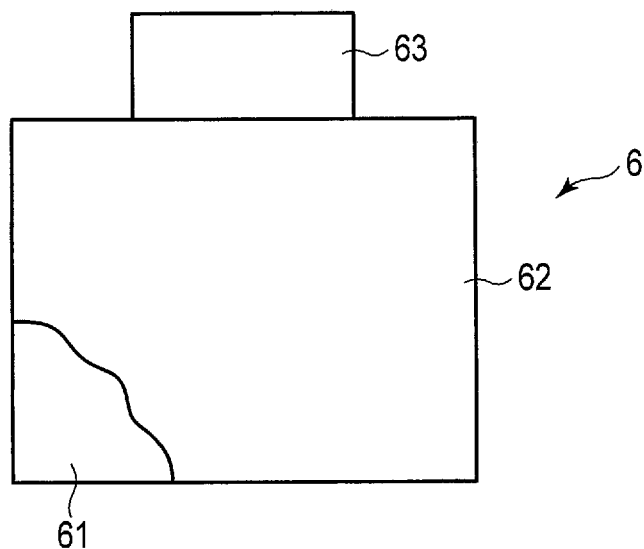
FIG. 1 is a partially cutaway schematic plan view of an example of a positive electrode according to a first embodiment.

Embodiments will be described below with reference to the drawings. Throughout the embodiments, the same components will be denoted by the same reference numerals and redundant description thereof will be omitted. Further, each drawing is a schematic diagram for explaining the embodiments and for promoting the understanding thereof. Though there are parts different from those of an actual device in shape, dimensions, ratio, and the like, these structural designs may properly be changed taking the following description and known technologies into consideration.

First Embodiment

According to a first embodiment, a positive electrode is provided. The positive electrode includes a positive electrode active material-containing layer which contains a positive electrode active material. The positive electrode active material contains a first positive electrode active material having a spinel type crystal structure. The positive electrode satisfies the following formulas (1) to (3) when combined with a negative electrode including a negative electrode active material-containing layer which contains a negative electrode active material containing a first negative electrode active material having a spinel type crystal structure:

$$0.5 \leq a1/b1 \leq 1.5 \quad (1);$$

$$0.4 \leq a2/b2 \leq 1.4 \quad (2); \text{ and}$$

$$0.5 \leq a3/b3 \leq 2.3 \quad (3).$$

Provided that, in Formulas (1) to (3), a1 is a pore volume [mL/g] per 1 g weight of the positive electrode active material-containing layer by mercury intrusion porosimetry. a2 is a pore specific surface area [m$^2$/g] of the positive electrode active material-containing layer by the mercury intrusion porosimetry. a3 is a median diameter [μm] in a pore distribution of the positive electrode active material-containing layer by the mercury intrusion porosimetry. b1 is a pore volume [mL/g] per 1 g weight of the negative electrode active material-containing layer by the mercury intrusion porosimetry. b2 is a pore specific surface area [m$^2$/g] of the negative electrode active material-containing layer by the mercury intrusion porosimetry. b3 is a median diameter [μm] in a pore distribution of the negative electrode active material-containing layer by the mercury intrusion porosimetry.

One of the measures for increasing the output of the lithium-ion secondary battery is to design the positive electrode and the negative electrode using active materials having a small particle diameter. This design aims to increase the pore surface areas of the active material-containing layers to increase the area involved in occlusion and release of lithium ions, and as a result, to reduce the battery resistance.

However, as a result of earnest research, it has been found that, when a lithium ion secondary battery produced using active materials having a small particle diameter for a positive electrode and a negative electrode is subjected to charge and discharge cycles, an oxidative decomposition reaction of a nonaqueous electrolyte, which is a side reaction that leads to a decrease in capacity and an increase in resistance, is likely to occur, or a film or the like is likely to be formed on the surfaces of the active materials. It has been found that, as a result, such a lithium-ion secondary battery can show high output in the initial state, but that, after a plurality of charge and discharge cycles, a decrease in capacity and an increase in resistance are caused due to the increase in the above-described side reaction. Therefore, it has been found that it is difficult to realize the battery depending on the design that active materials having a small particle diameter are used for the positive electrode and the negative electrode, unless some measures are taken.

The inventors have ascertained that the oxidative decomposition reaction of the nonaqueous electrolyte and the film formation on the surfaces of the active materials, in the lithium ion secondary battery produced using active materials having a small particle diameter for the positive electrode and the negative electrode, are caused by application of overvoltage to the positive electrode and/or the negative electrode in the charge and discharge cycles. Specifically, the inventors have ascertained that, when overvoltage is applied, the positive electrode potential and/or the negative electrode potential sharply rise(s) and/or sharply drop(s), and that the oxidative decomposition reaction of the nonaqueous electrolyte and the film formation on the active material surfaces are likely to be caused at high potential and low potential. Then, the inventors have ascertained that overvoltage is applied due to an imbalance in the charge transfer resistance between the positive electrode and the negative electrode when Li is inserted and desorbed.

As a result of further earnest research based on this finding, the inventors have realized the positive electrode according to the first embodiment.

First, the positive electrode active material-containing layer included in the positive electrode according to the first embodiment contains a first positive electrode active material having a spinel type crystal structure. Then, the positive electrode according to the first embodiment is combined with a negative electrode having a negative electrode active material-containing layer which contains a first negative electrode active material having a spinel type crystal structure. That is, the first positive electrode active material and the first negative electrode active material are common in that they have a spinel type crystal structure.

The compound having a spinel type crystal structure is excellent in diffusion properties of lithium ions inside the particles as compared with, for example, the compound having a layered rock salt type crystal structure. This is because the compound having a spinel type crystal structure enables three-dimensional diffusion of lithium ions inside the particles, and therefore can exhibit a lower diffusion resistance than that of the layered rock salt type crystal structure which allows only two-dimensional diffusion of lithium ions. The compounds having a spinel type crystal structure can commonly exhibit such excellent diffusion properties of lithium ions.

Therefore, the first positive electrode active material and the first negative electrode active material, which are common in having a spinel type crystal structure, can exhibit the same lithium ion diffusion properties. Therefore, the first positive electrode active material contained in the positive electrode according to the first embodiment can exhibit the similar lithium ion diffusion resistance to that of the first negative electrode active material of the negative electrode which is combined with the positive electrode. In particular, the first positive electrode active material and a first negative electrode active material can exhibit the similar lithium ion diffusion resistance even at the initial and final stages of charge and discharge of the battery.

Further, the positive electrode according to the first embodiment satisfies the following formulas (1) to (3) when combined with the negative electrode:

$$0.5 \leq a1/b1 \leq 1.5 \quad (1);$$

$$0.4 \leq a2/b2 \leq 1.4 \quad (2); \text{ and}$$

$$0.5 \leq a3/b3 \leq 2.3 \quad (3).$$

When the above formulas (1) to (3) are satisfied, the positive electrode and the negative electrode can be made on the same level regarding the amount of lithium ions that can be reacted upon contact with the surface of the active materials during charge and discharge of the battery, in other words, the amount of lithium ions inserted into and desorbed from the active materials.

As a result, the positive electrode according to the first embodiment can exhibit the charge transfer resistance on the same level with the negative electrode in the nonaqueous electrolyte battery. Therefore, the nonaqueous electrolyte battery provided with this positive electrode can prevent overvoltage from being applied to the positive electrode and/or the negative electrode during charge and discharge, and as a result, can prevent the potentials of the positive electrode and the negative electrode from sharply rising or dropping. Thus, such a nonaqueous electrolyte battery can prevent an electrolysis reaction of the nonaqueous electrolyte, which is a side reaction that easily occurs at high potential and low potential, and an increase of film on the surfaces of the active materials. That is, such a nonaqueous electrolyte battery can prevent a decrease in capacity and/or an increase in resistance when subjected to charge and discharge cycles. Therefore, the positive electrode according to the first embodiment can realize a nonaqueous electrolyte battery that can exhibit excellent cycle life performance.

A positive electrode that does not satisfy at least one of the above formulas (1), (2) and (3) when combined with a negative electrode exhibits charge transfer resistance which is excessively greatly different from that of the negative electrode, in a nonaqueous electrolyte battery, especially a nonaqueous electrolyte battery at the initial stage and final stage of charge and discharge of the battery, respectively. As a result, a nonaqueous electrolyte battery provided with such a positive electrode will be applied with overvoltage to the positive electrode and/or the negative electrode during a charge and discharge cycle, which causes a sharp rise and/or a sharp drop in positive electrode potential and/or negative electrode potential. As a result, such nonaqueous electrolyte battery cannot suppress a side reaction of the nonaqueous electrolyte and an increase of films on the surfaces of the active materials during the charge and discharge cycle, thereby causing a decrease in capacity and an increase in resistance. That is, such a nonaqueous electrolyte battery exhibits poor cycle life performance.

On the other hand, a positive electrode satisfying all of the above formulas (1), (2) and (3) when combined with the negative electrode, but containing no first positive electrode active material having a spinel type crystal structure does not exhibit lithium ion diffusion resistance on the same level with that of the first negative electrode active material contained in the negative electrode, so that exhibits charge transfer resistance which is excessively greatly different from that of the negative electrode in a nonaqueous electrolyte battery. Such a nonaqueous electrolyte battery exhibits poor cycle life performance for the same reason as described above.

A pore volume ratio $a1/b1$ is preferably in the range of 0.6 or more and 1.4 or less, and more preferably in the range of 0.7 or more and 1.1 or less. A pore specific surface area ratio $a2/b2$ is preferably in the range of 0.7 or more and 1.3 or less, and more preferably in the range of 0.9 or more and 1.2 or less. A median diameter ratio $a3/b3$ is preferably in the range of 0.5 or more and 2 or less, and more preferably in the range of 0.6 or more and 1 or less. The positive electrode having the respective ratios within the preferable ranges can exhibit charge transfer resistance closer to that of the negative electrode in a nonaqueous electrolyte battery, and, as a result, can realize more excellent cycle life performance.

Next, the positive electrode according to the first embodiment will be described in more detail. The "average particle diameter" which will be described later is the number average primary particle diameter when the target particles are primary particles, and the number average secondary particle diameter when the target particles are secondary particles. Alternatively, when the target particles are a mixture of primary particles and secondary particles, the "average particle diameter" is the number average particle diameter as measured without distinction between primary particles and secondary particles. The measuring method will be described later.

The positive electrode includes a positive electrode active material-containing layer which contains a positive electrode active material.

The positive electrode may further include a positive electrode current collector. The positive electrode current collector can have, for example, a band-like planar shape having two surfaces. The positive electrode active material-containing layer can be carried on, for example, one surface or both surfaces of the positive electrode current collector. The positive electrode current collector may include a portion that does not carry the positive electrode active material-containing layer on either of the surfaces. This portion can act as a positive electrode lead, for example. Alternatively, the positive electrode may include a positive electrode lead that is separate from the positive electrode current collector.

As the positive electrode current collector, for example, a metal foil such as aluminum or copper can be used.

The positive electrode active material includes a first positive electrode active material. The first positive electrode active material has a spinel type crystal structure. Examples of such a first positive electrode active material include lithium manganate having a spinel type crystal structure. The lithium manganate can have a composition represented by a composition formula of $LiMn_2O_4$, for example. The lithium manganate may further contain at least one metal element selected from the group consisting of Al, Mg, Ti, Cr, Fe, Co, Zn and Ga. The at least one metal element can replace a part of manganese in lithium manganate having the composition represented by the above composition formula, for example.

The positive electrode active material can also include a second positive electrode active material other than the first positive electrode active material. Examples of the second positive electrode active material can include a lithium nickel composite oxide, a lithium cobalt composite oxide, and a lithium nickel cobalt manganese composite oxide.

The weight proportion of the first positive electrode active material in the weight of the positive electrode active material is preferably 75% by weight or more and 100% by weight or less, and more preferably 80% by weight or more and 100% by weight or less. The positive electrode active material may be formed of the first positive electrode active material.

The positive electrode active material can have, for example, a particle shape. That is, the positive electrode active material-containing layer can contain particles of the positive electrode active material. The positive electrode active material particles may be primary particles, secondary particles in which primary particles are aggregated, or a mixture of primary particles and secondary particles. The positive electrode active material preferably contains secondary particles.

The positive electrode active material particles can have an average particle diameter of, for example, 0.5 µm or more and 5 µm or less. In a nonaqueous electrolyte battery produced using the positive electrode active material particles which contain the first positive electrode active material having a spinel type crystal structure and which have a small particle diameter within such a range, there is a problem, for example, that a side reaction that leads to a decrease in capacity and an increase in resistance is likely to occur, as described above, if no measures are taken. However, the positive electrode according to the first embodiment can prevent overvoltage from being applied to either the positive electrode or the negative electrode, and thus, even if the positive electrode contains positive electrode active material particles having an average particle diameter of 0.5 µm or more and 5 µm or less, it can suppress a side reaction that leads to a decrease in capacity and an increase in resistance. Furthermore, the positive electrode active material particles having an average particle diameter of 0.5 µm or more and 5 µm or less can have a large area with which lithium ions can react, and can exhibit lower diffusion resistance. As the diffusion resistance is lower, a smaller load is applied to the positive electrode active material during charge and discharge of the battery, and the deterioration of the positive electrode active material can further be suppressed. Therefore, the positive electrode of this preferred aspect can realize more excellent cycle life performance. The average particle diameter of the positive electrode active material particles is more preferably in the range of 2 µm or more and 4 µm or less. The positive electrode active material particles having an average particle diameter within this range can be used to realize more excellent cycle life performance.

The positive electrode active material-containing layer may further contain a conductive agent.

The conductive agent that can be contained in the positive electrode active material layer preferably contains a carbon material. Examples of the carbon material can include acetylene black, Ketjen black, furnace black, graphite and carbon nanotubes. The positive electrode active material-containing layer may contain one or more of the above carbon materials, or may further contain another conductive agent. The conductive agent can have, for example, a particle shape.

Preferably, the positive electrode active material-containing layer contains particles of the positive electrode active material and particles of the conductive agent, and shows a particle size distribution by a laser diffraction scattering method in which a particle diameter D10 is 0.1 µm or more and 2 µm or less, a particle diameter D50 is 0.3 µm or more and 4 µm or less, and a particle diameter D90 is 3 µm or more and 10 µm or less. The particle diameter D10 is more preferably 0.4 µm or more and 1.3 µm or less. The particle diameter D50 is more preferably 1.3 µm or more and 3.5 µm or less. The particle diameter D90 is more preferably 3.5 µm or more and 9 µm or less. The particle diameter D10 is a particle diameter [µm] at which the cumulative frequency from the small particle diameter side is 10% in the particle size distribution of the positive electrode active material-containing layer. The particle diameter D50 is a particle diameter [µm] at which the cumulative frequency from the small particle diameter side is 50% in the particle size distribution of the positive electrode active material-containing layer, that is, an average particle diameter [µm]. The particle diameter D90 is a particle diameter [µm] at which the cumulative frequency from the small particle diameter side is 90% in the particle size distribution of the positive electrode active material-containing layer. The particle diameters D10, D50 and D90 satisfy the relational expression: D10<D50<D90. The method for measuring the particle size distribution of the positive electrode active material-containing layer will be described later in detail. The particle size distribution of the positive electrode active material-containing layer can also be regarded as a particle size distribution of a mixture of positive electrode active material particles and conductive agent particles contained in the positive electrode active material containing layer.

Moreover, the positive electrode active material-containing layer may further contain a binder. The binder that can be contained in the positive electrode active material-containing layer contains, for example, at least polyvinylidene fluoride, and may further contain other binders. For example, as the binder, a polymer that is well dispersed in a mixing solvent for slurry preparation can be used. Examples of such a polymer include polyvinylidene fluoride, hexafluoropropylene, and polytetrafluoroethylene.

The contents of the positive electrode active material, the conductive agent and the binder in the positive electrode active material-containing layer are 85% by weight or more and less than 97.5% by weight, 2% by weight or more and 10% by weight or less, and 0.5% by weight or more and 5% by weight or less, respectively, relative to the weight of the positive electrode active material-containing layer. By incorporating the conductive agent and the binder in amounts within the ranges, it is possible to realize a higher capacity and to prevent deterioration in cycle life performance due to peeling of the positive electrode active material-containing layer.

The positive electrode active material-containing layer may also contain an Na element and/or an S element. These elements are, for example, elements originated from impurities. The total content of the Na element and the S element in the positive electrode active material-containing layer is preferably 1% by weight or less. In the nonaqueous electrolyte battery using the positive electrode of this preferred aspect, it is possible to prevent inhibition of diffusion and insertion and desorption reactions of lithium in the positive electrode at the time of charge and discharge, and, as a result, to further suppress an increase in resistance. The total content of the Na element and the S element is more preferably 0.5% by weight or less. The positive electrode active material-containing layer preferably does not contain any Na element or S element.

The pore volume a1 per 1 g weight of the positive electrode active material-containing layer by mercury intrusion porosimetry is preferably 0.05 mL/g or more and 0.2 mL/g or less, and more preferably 0.1 mL/g or more and 0.18 mL/g or less. The pore specific surface area a2 of the positive electrode active material-containing layer by the mercury intrusion porosimetry is preferably 3 $m^2$/g or more and 15 $m^2$/g or less, and more preferably 8 $m^2$/g or more and 14 $m^2$/g or less. The median diameter a3 in the pore distribution of the positive electrode active material-containing layer by the mercury intrusion porosimetry is preferably 0.01 μm or more and 0.3 μm or less, and more preferably 0.03 μm or more and 0.15 μm or less.

The median diameter a3 is a pore diameter [μm] at which the cumulative frequency from the smaller pore diameter side is 50% in the pore distribution of the positive electrode active material-containing layer by the mercury intrusion porosimetry. The method of obtaining the pore distribution of the positive electrode active material-containing layer by the mercury intrusion porosimetry will be described in detail later.

A density dc of the positive electrode active material-containing layer is preferably 2 $g/cm^3$ or more and 5 $g/cm^3$ or less, and more preferably 2.5 $g/cm^3$ or more and 3.5 $g/cm^3$ or less.

The positive electrode according to the first embodiment can be produced, for example, by the following method. First, the first positive electrode active material, an optional second positive electrode active material, an optional conductive agent, and an optional binder are put into an appropriate solvent to obtain a mixture. Then, the obtained mixture is put into a stirrer. In this stirrer, the mixture is stirred to obtain a slurry. The slurry thus obtained is applied onto both surfaces or one surface of the positive electrode current collector. At this time, the positive electrode current collector may have a portion where no slurry is applied to either of the surfaces. The coating film is then dried and pressed. Thus, the positive electrode can be produced. The pore distribution and particle size distribution of the positive electrode active material-containing layer can be adjusted within the ranges described above, for example, by selecting the types of positive electrode active material, conductive agent and binder, and adjusting parameters such as the blending ratio, particle diameter of the particles of each of the positive electrode active material and the conductive agent, conditions for stirring (dispersing) the mixture, and pressing conditions. The positive electrode according to the first embodiment cannot be produced unless there is an idea to adjust the state of the pores of the positive electrode active material-containing layer so as to satisfy the above formulas (1) to (3) when the positive electrode is combined with the negative electrode. The particle diameter of the positive electrode active material can be adjusted by adjusting firing conditions, adjusting the diameter of a precursor, classification after firing, and the like. Specific examples will be described in the EXAMPLES.

The negative electrode to be combined with the positive electrode according to the first embodiment is not particularly limited as long as it has a negative electrode active material-containing layer which contains a negative electrode active material including a first negative electrode active material having a spinel type crystal structure, and the positive electrode according to the first embodiment, when combined with the negative electrode, satisfies the above formulas (1) to (3). Details of the negative electrode will be described in the section of a second embodiment.

<Various Measurement Methods>

Next, various measurement methods will be described.

[Pretreatment]

When analyzing the positive electrode incorporated in the battery, the positive electrode is taken out by the following procedures.

1. Disassembly of Nonaqueous Electrolyte Battery

First, as a preliminary preparation, gloves are worn so as not to directly touch the electrodes or the nonaqueous electrolyte.

Next, in order to prevent the constituent elements of the battery from reacting with atmospheric components and moisture during disassembly, the nonaqueous electrolyte battery is placed in a glove box in an argon atmosphere.

The nonaqueous electrolyte battery is opened in such a glove box. For example, the nonaqueous electrolyte battery can be cut open by cutting heat-sealed parts on the peripheries of a positive electrode current collector tab and a negative electrode current collector tab.

The electrode group is taken out from the cut-open nonaqueous electrolyte battery. When the taken-out electrode group includes the positive electrode lead and the negative electrode lead, the positive electrode lead and the negative electrode lead are cut while taking care to prevent short circuits of the positive electrode and the negative electrode.

Next, the electrode group is dismantled and disassembled into a positive electrode, a negative electrode and a separator. The positive electrode, negative electrode and separator thus obtained are washed with ethyl methyl carbonate as a solvent.

In this washing, the members obtained by disassembly are completely immersed in the ethyl methyl carbonate solvent, and left in that state for 1 minute.

The washing is performed on each of the positive electrode, the negative electrode, and the separator, and the ethyl methyl carbonate solvent is replaced with a fresh one for each washing.

After washing, the positive electrode, the negative electrode and the separator are vacuum-dried. The vacuum drying is carried out by reducing the pressure from atmospheric pressure to −90 kpa in a 25° C. environment and retaining that state for 10 minutes.

The positive electrode thus taken out through the disassembly, washing and vacuum drying is used as a target for the following measurements.

When analyzing a positive electrode that is not incorporated in a battery, part or all of the pretreatment described here may be omitted.

2. Measurement of Pore Distribution

From the positive electrode, a plurality of measurement samples of strip-shaped pieces each having a planar shape having dimensions of 1.25 cm×2.50 cm are cut out. The weight of each of the cut-out measurement samples is measured. Next, 24 measurement samples are placed into a cell of a measuring device. These measurement samples are subjected to pore distribution measurement under conditions of an initial pressure of 20 kPa (corresponding to a pore diameter of 60 μm) and a final pressure of 400 MPa (corresponding to a pore diameter of 3 nm).

After the measurement, the measurement sample is taken out from the measuring device. Then, the positive electrode active material-containing layer is peeled off from each of the measurement samples to obtain a positive electrode current collector piece. For example, a positive electrode current collector piece can be obtained by gently peeling off the positive electrode active material-containing layer with a cotton swab impregnated with N-methylpyrrolidone. Alternatively, the positive electrode current collector piece can also be obtained by dropping N-methylpyrrolidone on the measurement sample and then wiping it off with a cotton swab or a clean wipe. The weight of the positive electrode current collector piece thus obtained is measured. The weight of the positive electrode active material-containing layer contained in the measurement sample is determined by subtracting the weight of the positive electrode current collector piece from the weight of the measurement sample previously measured.

From the pore distribution obtained as described above and the weight of the positive electrode active material-containing layer contained in the measurement sample, the pore volume [mL/g] per 1 g weight of the positive electrode active material-containing layer, the pore specific surface area [m$^2$/g] of the positive electrode active material-containing layer, and the median diameter [μm] in the pore distribution can be obtained, respectively. The averages of the parameters for the 24 measurement samples are defined as the pore volume a1 [mL/g] per 1 g weight of the positive electrode active material-containing layer, the pore specific surface area a2 [m$^2$/g] of the positive electrode active material-containing layer, and the median diameter a3 [μm] in the pore distribution.

An example of the measuring device for measuring the pore distribution can be a micromeritics pore distribution measuring device Autopore 9520 manufactured by Shimadzu Corporation.

FIG. 5 shows the pore distribution of the positive electrode active material-containing layer included in the positive electrode as one example according to the first embodiment. Details of the pore distribution shown in FIG. 5 will be described in the EXAMPLES.

3. Measurement of Particle Size Distribution

The positive electrode active material-containing layer is peeled off from a part of the positive electrode using, for example, a spatula. Thus, powder of a positive electrode active material-containing layer specimen is obtained.

Then, the positive electrode active material-containing layer specimen is put into a measurement cell filled with N-methylpyrrolidone until a measurable concentration is reached. The capacity of the measurement cell and the measurable concentration differ depending on the particle size distribution measuring device.

The measurement cell containing N-methyl-pyrrolidone and the positive electrode active material-containing layer specimen dissolved therein is irradiated with ultrasonic waves with an output of 40 W for 5 minutes. By such ultrasonic irradiation, the aggregation between the conductive agent particles and the active material particles can be broken. On the other hand, the aggregated state of the active material particles and the aggregated state of the conductive agent particles are maintained.

The measurement cell subjected to ultrasonic treatment is placed into a particle size distribution measuring device by the laser diffraction scattering method, and subjected to particle size distribution measurement. An example of the particle size distribution measuring device can be Microtrac 3100.

Thus, the particle size distribution of the positive electrode active material-containing layer can be obtained.

FIG. 6 shows the particle size distribution of the positive electrode active material-containing layer included in the positive electrode as one example according to the first embodiment. Details of the particle size distribution shown in FIG. 6 will be described in the EXAMPLES.

4. Analysis of Element Contained in Positive Electrode Active Material-Containing Layer and Identification of Active Material (1) Inductively Coupled Plasma (ICP) Emission Spectroscopy A part of the positive electrode active material-containing layer specimen peeled off from the positive electrode as described above is measured out and used as a measurement sample. Then, the weight of the measurement sample is measured. Then, the measurement sample is subjected to acid heat treatment to remove the binder and the conductive agent from the measurement sample. The specimen thus obtained is subjected to ICP emission spectroscopy.

The elements to be measured are Li, Al, Mn, Ba, Ca, Ce, Co, Cr, Cu, Fe, Hf, K, La, Mg, Na, Ni, Pb, Si, S, Ti, Y, Zn and Zr. The overall composition of the positive electrode active material can be identified by calculating the mole fraction of each element from the measurement results.

(2) X-Ray Diffraction (XRD) Measurement

XRD measurement is performed on a part of the positive electrode. The range of a diffraction angle (2θ) is set to 10° to 90°, and the X-ray diffraction intensity is measured by 0.02°. Thus, XRD measurement results are obtained.

On the other hand, based on the identification results of the composition by ICP analysis, the pattern of the peak specific to the active material estimated from the composition of the active material is estimated based on a database.

By comparing the estimated X-ray pattern with the actually measured X-ray pattern, the crystal structure of the positive electrode active material contained in the positive electrode active material-containing layer can be identified.

(3) Scanning Electron Microscope (SEM) Observation, and Analysis by Energy Dispersive X-Ray Spectroscopy (EDX) and Electron Energy-Loss Spectroscopy (EELS)

When the positive electrode active material-containing layer contains a plurality of types of positive electrode active materials, the actually measured X-ray pattern obtained by the XRD measurement includes peaks derived from a plurality of types of positive electrode active materials. The peak derived from each of the active materials may or may not overlap with the peaks derived from the other active materials. When the peaks do not overlap, the composition and mixing ratio of each of the positive electrode active materials contained in the positive electrode can be known by the above XRD measurement and ICP analysis.

On the other hand, when the peaks overlap, the composition and mixing ratio of each of the positive electrode active materials contained in the positive electrode are determined by SEM observation, EDX analysis and EELS analysis. Specifically, the determination method is as follows.

First, a piece of about 2 cm×2 cm is cut out from the positive electrode with a cutter or the like. The cross section of the cut-out piece is irradiated with argon ions accelerated at an acceleration voltage of 2 to 6 kV to obtain a flat cross section.

Next, the compositions of several active material particles contained in the cross section of the positive electrode are analyzed using SEM with EDX and EELS. EDX enables quantitative analysis of elements from B to U. Li can be quantitatively analyzed by EELS. Thus, the composition of each of the positive electrode active materials contained in the positive electrode active material-containing layer can be known.

Then, the mixing ratio of the positive electrode active materials in the positive electrode can be known from the overall composition of the positive electrode active material and the composition of the respective positive electrode active materials. Then, based on the results, the weight proportion of the first positive electrode active material in the weight of the positive electrode active material can also be determined.

(4) Contents of Na and S

The weights of Na and S contained in the measurement sample can be determined from the results of the composition analysis described above. By dividing the weights by the content of the measurement sample, the respective contents of Na and S in the positive electrode active material-containing layer can be obtained.

5. Method for Measuring Density of Positive Electrode Active Material-Containing Layer The density dc of the positive electrode active material-containing layer can be measured by the following procedures.

First, the thickness of the prepared positive electrode is measured using a thickness measuring machine. Then, the positive electrode is punched into a size of 1 cm×1 cm using a cutting machine to obtain a specimen having a size of 1 cm×1 cm. The weight of this specimen is measured.

Next, the positive electrode active material-containing layer is peeled off from the specimen. For example, the positive electrode active material-containing layer can be peeled off from the specimen by immersing the specimen in a solvent such as N-methylpyrrolidone, taking out the specimen from the solvent, and gently wiping off the positive electrode active material-containing layer impregnated with the solvent with a cotton swab or the like. Any solvent may be used as the solvent for peeling off the positive electrode active material-containing layer as long as it does not erode the positive electrode current collector and can be used to peel off the positive electrode active material-containing layer. The thickness and weight of the positive electrode current collector specimen remaining as the specimen are measured.

Next, the thickness of the positive electrode current collector is subtracted from the thickness of the positive electrode to calculate the thickness of the positive electrode active material-containing layer. Further, the weight of the positive electrode current collector specimen is subtracted from the weight of the specimen having a size of 1 cm×1 cm to calculate the weight of the positive electrode active material-containing layer having a size of 1 cm×1 cm. Then, the density dc (unit: $g/cm^3$) of the positive electrode active material-containing layer can be calculated by dividing the weight of the positive electrode active material-containing layer having a size of 1 cm×1 cm by the thickness of the positive electrode active material-containing layer.

The acquisition of the pore distribution and particle size distribution of the negative electrode active material-containing layer of the negative electrode to be combined with the positive electrode according to the first embodiment, and the identification of the negative electrode active material contained in the negative electrode active material-containing layer can be performed by the same procedures as those described above, except that the negative electrode is used as the target for measurement.

Next, a specific example of the positive electrode according to the first embodiment will be described in more detail with reference to the drawings.

FIG. 1 is a partially cutaway schematic plan view of an example of the positive electrode according to the first embodiment.

A positive electrode 6 shown in FIG. 1 includes a positive electrode current collector 61 and positive electrode active material-containing layers 62 formed on both surfaces of the positive electrode current collector 61. Further, as shown in FIG. 1, the positive electrode current collector 61 includes a portion 63 having a surface on which the positive electrode active material-containing layer 62 is not formed, and this portion 63 functions as a positive electrode lead. As shown in FIG. 1, the positive electrode lead 63 is a narrow part narrower in width than the positive electrode active material-containing layer 62.

According to a first embodiment, a positive electrode is provided. This positive electrode includes a positive electrode active material-containing layer which contains a positive electrode active material. The positive electrode active material includes a first positive electrode active material having a spinel type crystal structure. This positive electrode, when combined with a negative electrode having a negative electrode active material-containing layer which contains a first negative electrode active material having a spinel type crystal structure, satisfies the following formulas (1): $0.5 \le a1/b1 \le 1.5$; (2): $0.4 \le a2/b2 \le 1.4$; and (3): $0.5 \le a3/$ b3≤2.3. This positive electrode can exhibit charge transfer resistance on a same level with that of the negative electrode in a nonaqueous electrolyte battery. As a result, the positive electrode according to the first embodiment can realize a nonaqueous electrolyte battery that can exhibit excellent cycle life performance.

Second Embodiment

According to a second embodiment, an electrode group is provided. This electrode group includes a positive electrode and a negative electrode. The positive electrode includes a positive electrode active material-containing layer which contains a positive electrode active material. The positive electrode active material includes a first positive electrode active material having a spinel type crystal structure. The negative electrode has a negative electrode active material-containing layer which contains a negative electrode active material. The negative electrode active material includes a first negative electrode active material having a spinel type crystal structure. This electrode group satisfies the following formulas (1) to (3):

$$0.5 \leq a1/b1 \leq 1.5 \quad (1);$$

$$0.4 \leq a2/b2 \leq 1.4 \quad (2); \text{ and}$$

$$0.5 \leq a3/b3 \leq 2.3 \quad (3).$$

Provided that, in Formulas (1) to (3), a1 is a pore volume [mL/g] per 1 g weight of the positive electrode active material-containing layer by mercury intrusion porosimetry. a2 is a pore specific surface area [m$^2$/g] of the positive electrode active material-containing layer by the mercury intrusion porosimetry. a3 is a median diameter [μm] in a pore distribution of the positive electrode active material-containing layer by the mercury intrusion porosimetry. b1 is a pore volume [mL/g] per 1 g weight of the negative electrode active material-containing layer by the mercury intrusion porosimetry. b2 is a pore specific surface area [m$^2$/g] of the negative electrode active material-containing layer by the mercury intrusion porosimetry. b3 is a median diameter [μm] in a pore distribution of the negative electrode active material-containing layer by the mercury intrusion porosimetry.

The electrode group according to the second embodiment includes a positive electrode which contains a first positive electrode active material having a spinel type crystal structure and a negative electrode which contains a first negative electrode active material having a spinel type crystal structure. Further, the electrode group according to the second embodiment satisfies the above formulas (1) to (3). Due to these, in the electrode group according to the second embodiment, when used in the nonaqueous electrolyte battery, the positive electrode and the negative electrode can exhibit charge transfer resistance on a same level, for the same reason as described in the first embodiment. Therefore, the nonaqueous electrolyte battery provided with this electrode group can prevent overvoltage from being applied to the positive electrode and/or the negative electrode during charge and discharge, and as a result, to prevent the potentials of the positive electrode and the negative electrode from sharply rising or dropping. Therefore, the electrode group according to the second embodiment can realize a nonaqueous electrolyte battery that can exhibit excellent cycle life performance.

Next, the electrode group according to the second embodiment will be described in more detail.

The electrode group according to the second embodiment includes a positive electrode and a negative electrode.

The positive electrode included in the electrode group according to the second embodiment can have the same structure as that of the positive electrode according to the first embodiment. Further, the material for the positive electrode included in the electrode group according to the second embodiment can be, for example, the same material as the material for the positive electrode according to the first embodiment. Therefore, as for details of the positive electrode included in the electrode group according to the second embodiment, refer to the description in the section of the first embodiment.

The negative electrode has a negative electrode active material-containing layer which contains a negative electrode active material.

The negative electrode may further include a negative electrode current collector. The negative electrode current collector can have, for example, a band-like planar shape having two surfaces. The negative electrode active material-containing layer can be carried on, for example, one surface or both surfaces of the negative electrode current collector. The negative electrode current collector may include a portion that does not carry the negative electrode active material-containing layer on either of the surfaces. This portion can act as a negative electrode lead, for example. Alternatively, the negative electrode may include a negative electrode lead that is separate from the negative electrode current collector.

As the negative electrode current collector, for example, a metal foil such as aluminum or copper can be used.

The negative electrode active material includes a first negative electrode active material. The first negative electrode active material has a spinel type crystal structure. Examples of such a first negative electrode active material include a lithium-titanium composite oxide having a spinel type crystal structure. The lithium-titanium composite oxide having a spinel type crystal structure can be represented by, for example, a composition formula of $Li_4Ti_5O_{12}$.

The negative electrode active material can also include a second negative electrode active material other than the first negative electrode active material. Examples of the second negative electrode active material can include graphite materials or carbonaceous materials (graphite, coke, carbon fibers, spherical carbon, pyrolysis vapor-phase carbonaceous material, resin fired body, etc.), chalcogen compounds (titanium disulfide, molybdenum disulfide, niobium selenide, etc.), and light metals (aluminum, aluminum alloys, magnesium alloys, lithium, lithium alloys, etc.). Alternatively, as the second negative electrode active material, a titanium-containing oxide such as a lithium-titanium composite oxide having a ramsdellite type crystal structure, a niobium titanium composite oxide having a monoclinic crystal structure, titanium dioxide having a monoclinic crystal structure, or a Na-containing niobium titanium composite oxide having an orthorhombic crystal structure can be used.

The weight proportion of the first negative electrode active material in the weight of the negative electrode active material is preferably 75% by weight or more and 100% by weight or less, and more preferably 90% by weight or more and 100% by weight or less. The negative electrode active material may be formed of the first negative electrode active material.

The negative electrode active material can have, for example, a particle shape. That is, the negative electrode active material-containing layer can contain particles of the negative electrode active material. The negative electrode active material particles may be primary particles, secondary particles in which primary particles are aggregated, or a mixture of primary particles and secondary particles. The negative electrode active material is preferably in the state of primary particles.

The negative electrode active material particles can have an average particle diameter of, for example, 0.5 µm or more and 5 µm or less. The negative electrode active material particles having an average particle diameter of 0.5 µm or more and 5 µm or less can have a large area with which lithium ions can react, and can exhibit lower diffusion resistance. As the diffusion resistance is lower, a smaller load is applied to the negative electrode active material during charge and discharge of the battery, and the deterioration of the negative electrode active material can further be suppressed, so that more excellent cycle life performance can be realized. The average particle diameter of the negative electrode active material particles is more preferably in the range of 0.7 µm or more and 1.5 µm or less. The negative electrode active material particles having an average particle diameter within this range can be used to realize more excellent cycle life performance.

The negative electrode active material-containing layer may further contain a conductive agent. As the conductive agent that can be contained in the negative electrode active material-containing layer, the same conductive agent as the conductive agent that can be contained in the positive electrode active material-containing layer can be used. The conductive agent that can be contained in the negative electrode active material-containing layer can have, for example, a particle shape.

Preferably, the negative electrode active material-containing layer contains particles of the negative electrode active material and particles of the conductive agent, and shows a particle size distribution by a laser diffraction scattering method in which a particle diameter D10 is 0.1 µm or more and 1 µm or less, a particle diameter D50 is 0.5 µm or more and 2.5 µm or less, and a particle diameter D90 is 2 µm or more and 5 µm or less. The particle diameter D10 is a particle diameter [µm] at which the cumulative frequency from the small particle diameter side is 10% in the particle size distribution of the negative electrode active material-containing layer by the laser diffraction scattering method. The particle diameter D50 is a particle diameter [µm] at which the cumulative frequency from the small particle diameter side is 50% in the particle size distribution of the negative electrode active material-containing layer by the laser diffraction scattering method, that is, an average particle diameter [µm]. The particle diameter D90 is a particle diameter [µm] at which the cumulative frequency from the small particle diameter side is 90% in the particle size distribution of the negative electrode active material-containing layer by the laser diffraction scattering method. The particle diameters D10, D50 and D90 satisfy the relational expression: D10<D50<D90. The measuring method is as described above. The particle size distribution of the negative electrode active material-containing layer can also be regarded as a particle size distribution of a mixture of negative electrode active material particles and conductive agent particles contained in the negative electrode active material containing layer.

Moreover, the negative electrode active material-containing layer may further contain a binder. As the binder that can be contained in the negative electrode active material-containing layer, the same one that can be contained in the positive electrode active material-containing layer can be used.

The contents of the negative electrode active material, the conductive agent and the binder in the negative electrode active material-containing layer are 90% by weight or more and less than 97% by weight, 1% by weight or more and 7% by weight or less, and 1% by weight or more and 4% by weight or less, respectively, relative to the weight of the negative electrode active material-containing layer. By incorporating the conductive agent and the binder in amounts within the ranges, it is possible to realize a higher capacity and to prevent deterioration in cycle life performance due to peeling of the negative electrode active material-containing layer.

Therefore, for the electrode group according to the second embodiment, the preferable ranges and more preferable ranges of the ratio a1/b1, the ratio a2/b2 and the ratio a3/b3 are the same as those described in the section of the first embodiment.

The pore volume b1 per 1 g weight of the negative electrode active material-containing layer by mercury intrusion porosimetry is preferably 0.1 mL/g or more and 0.15 mL/g or less, and more preferably 0.11 mL/g or more and 0.13 mL/g or less. The pore specific surface area b2 of the negative electrode active material-containing layer by the mercury intrusion porosimetry is preferably 8 $m^2/g$ or more and 13 $m^2/g$ or less, and more preferably 9 $m^2/g$ or more and 12 $m^2/g$ or less. The median diameter b3 in the pore distribution of the negative electrode active material-containing layer by the mercury intrusion porosimetry is preferably 0.01 µm or more and 0.3 µm or less, and more preferably 0.04 µm or more and 0.1 µm or less.

The median diameter b3 is a pore diameter [µm] at which the cumulative frequency from the smaller pore diameter side is 50% in the pore distribution of the negative electrode active material-containing layer by the mercury intrusion porosimetry. The method for obtaining the pore distribution of the negative electrode active material-containing layer by the mercury intrusion porosimetry is as described above.

A density da of the negative electrode active material-containing layer is preferably 1 $g/cm^3$ or more and 3 $g/cm^3$ or less, and more preferably 1.5 $g/cm^3$ or more and 2.5 $g/cm^3$ or less. The density da of the negative electrode active material-containing layer can be measured by the same procedures as those of the method for measuring the density dc of the positive electrode active material-containing layer, except that the negative electrode is used as the target for measurement.

The negative electrode can be produced, for example, by the following procedures. First, the negative electrode active material, an optional conductive agent, and an optional binder are mixed. The mixture thus obtained is poured into a solvent to prepare a slurry. This slurry is applied to the negative electrode current collector. At this time, the negative electrode current collector may have a portion where no slurry is applied to either of the surfaces. The coating film is then dried and pressed. Thus, the negative electrode can be produced. The pore distribution and particle size distribution of the negative electrode active material-containing layer can be adjusted within the ranges described above, for example, by selecting the types of negative electrode active material, conductive agent and binder, and adjusting parameters such as the blending ratio, particle diameter of the particles of each of the negative electrode active material and the conductive agent, conditions for stirring (dispersing)

the mixture, and pressing conditions. Specific examples will be described in the EXAMPLES.

The electrode group may further include a separator arranged between the positive electrode and the negative electrode. The separator is arranged, for example, between the positive electrode active material-containing layer and the negative electrode active material-containing layer. The separator may also include a portion that is not arranged between the positive electrode and the negative electrode. For example, the separator may include a portion located in the outermost layer of the electrode group.

The separator is not particularly limited, and, for example, a microporous film, a woven fabric, nonwoven fabric, or a laminate of the same materials or different materials can be used. Examples of the material forming the separator include polyethylene, polypropylene, ethylene-propylene copolymers, ethylene-butene copolymers, and cellulose.

It is preferable that a median diameter c3 [μm] in the pore distribution of the separator by the mercury intrusion porosimetry should be larger than the median diameter a3 of the positive electrode active material-containing layer and the median diameter b3 of the negative electrode active material-containing layer. The electrode group of this preferred embodiment can promote the movement of lithium ions through the separator, and, as a result, can prevent adverse effects on the charge transfer resistances of the positive electrode and the negative electrode, in a nonaqueous electrolyte battery. The pore distribution of the separator can be obtained by the same method as that described above, except that the separator is the target for measurement.

The structure of the electrode group is not particularly limited. For example, the electrode group can have a stack structure. The stack structure has a structure in which the positive electrodes and the negative electrodes, as described above, are alternately stacked with the separator interposed therebetween. Alternatively, the electrode group can have a wound structure. The wound structure is a structure obtained by laminating the positive electrodes and the negative electrodes, as described above, with the separator interposed therebetween, and spirally winding the laminate thus obtained. The wound electrode group may have a cylindrical shape or a flat shape. The flat wound electrode group can be obtained, for example, by pressing a cylindrical electrode group.

Next, an example of the electrode group according to the second embodiment will be specifically described with reference to the drawings.

Figure 2:
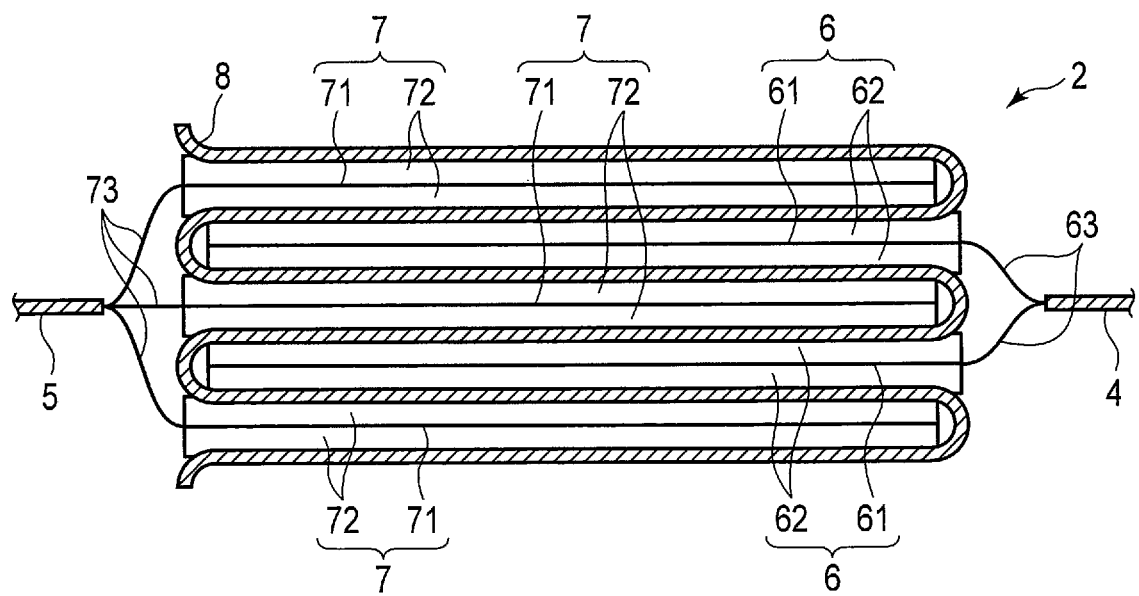
FIG. 2 is a schematic cross-sectional view of an example of an electrode group according to a second embodiment.

FIG. 2 is a schematic cross-sectional view of an example of the electrode group according to the second embodiment.

The electrode group 2 shown in FIG. 2 includes a plurality of (e.g., two) positive electrodes 6, a plurality of (e.g., three) negative electrodes 7, and a separator 8.

Each of the positive electrodes 6 has the same structure as that described with reference to FIG. 1. That is, each of the positive electrodes 6 includes a positive electrode current collector 61 and positive electrode active material-containing layers 62 formed on both surfaces of the positive electrode current collector 61. Further, as shown in FIG. 2, the positive electrode current collector 61 includes a portion 63 having a surface on which the positive electrode active material-containing layer 62 is not formed, and this portion 63 functions as a positive electrode lead.

As shown in FIG. 2, each of the negative electrodes 7 includes a negative electrode current collector 71 and negative electrode active material containing layers 72 formed on both surfaces of the negative electrode current collector 71. Further, as shown in FIG. 2, the negative electrode current collector 71 includes a portion 73 having a surface on which the negative electrode active material-containing layer 72 is not formed, and this portion 73 functions as a negative electrode lead.

The separator 8 is folded in a zigzag shape as shown in FIG. 2. As a result, the separator 8 forms a plurality of (for example, five) spaces defined by the surfaces facing each other.

As shown in FIG. 2, the positive electrodes 6 and the negative electrodes 7 are alternately arranged in these spaces. As a result, each of the positive electrode active material-containing layers 62 of the respective positive electrodes 6 faces one of the negative electrode active material-containing layers 72 of the respective negative electrodes 7 with a part of the separator 8 interposed therebetween.

Further, as shown in FIG. 2, the plurality of positive electrode leads 63 extend from the electrode group 2 in the same direction in the vicinity of the middle stage of the electrode group 2. The tips of the positive electrode leads 63 are gathered together and connected to a positive electrode current collector tab 4. Similarly, the plurality of negative electrode leads 73 extend from the electrode group 2 in the same direction and in the direction opposite to the extending direction of the positive electrode leads 63, in the vicinity of the middle stage of the electrode group 2. The tips of the negative electrode leads 73 are gathered together and connected to a negative electrode current collector tab 5.

According to a second embodiment, an electrode group is provided. The electrode group includes a positive electrode which contains a first positive electrode active material having a spinel type crystal structure and a negative electrode which contains a first negative electrode active material having a spinel type crystal structure. Also, this electrode group satisfies the above formulas (1) to (3). Due to these, in the electrode group according to the second embodiment, when used in the nonaqueous electrolyte battery, the positive electrode and the negative electrode can exhibit charge transfer resistance on a same level. Therefore, the electrode group according to the second embodiment can realize a nonaqueous electrolyte battery that can exhibit excellent cycle life performance.

Third Embodiment

According to a third embodiment, a nonaqueous electrolyte battery is provided. This nonaqueous electrolyte battery includes the electrode group according to the second embodiment and a nonaqueous electrolyte.

The nonaqueous electrolyte can be impregnated into the electrode group, for example.

The nonaqueous electrolyte can be prepared by dissolving an electrolyte (for example, a lithium salt) in a nonaqueous solvent.

Examples of the nonaqueous solvent include ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. One type of nonaqueous solvent may be used alone, or a solvent mixture prepared by mixing two or more types of nonaqueous solvents may be used.

Examples of the electrolyte can include lithium salts such as lithium perchlorate ($LiClO_4$), lithium hexafluorophosphate ($LiPF_6$), lithium tetrafluoroborate ($LiBF_4$), lithium hexafluoroarsenate (LiAsF$_6$), and lithium trifluoromethanesulfonate (LiCF$_3$SO$_3$). One type of electrolyte may be used alone, or a mixture of two or more types of electrolytes may be used.

The amount of the electrolyte dissolved in the nonaqueous solvent is desirably 0.5 mol/L to 3 mol/L. If the concentration of the electrolyte is too low, sufficient ionic conductivity may not be obtained. On the other hand, if the concentration of the electrolyte is too high, the electrolyte may not be completely dissolved in the electrolytic solution.

The nonaqueous electrolyte battery according to the third embodiment may further include a container for housing the electrode group and the nonaqueous electrolyte.

As the material of the container, for example, aluminum, an aluminum alloy, iron (Fe), an aluminum-containing laminate film, nickel (Ni) plated iron, stainless steel (SUS), or the like can be used.

Also, the nonaqueous electrolyte battery according to the third embodiment can further include a positive electrode current collector tab electrically connected to the positive electrode lead and a negative electrode current collector tab electrically connected to the negative electrode lead. The positive electrode current collector tab and the negative electrode current collector tab can be drawn out of the container to serve as a positive electrode terminal and a negative electrode terminal. Alternatively, the positive electrode current collector tab and the negative electrode current collector tab can be connected to the positive electrode terminal and the negative electrode terminal, respectively.

The positive electrode current collector tab, the negative electrode current collector tab, the positive electrode terminal and the negative electrode terminal are desirably formed of, for example, aluminum or an aluminum alloy.

Next, an example of the nonaqueous electrolyte battery according to the third embodiment will be specifically described with reference to the drawings.

Figure 3:
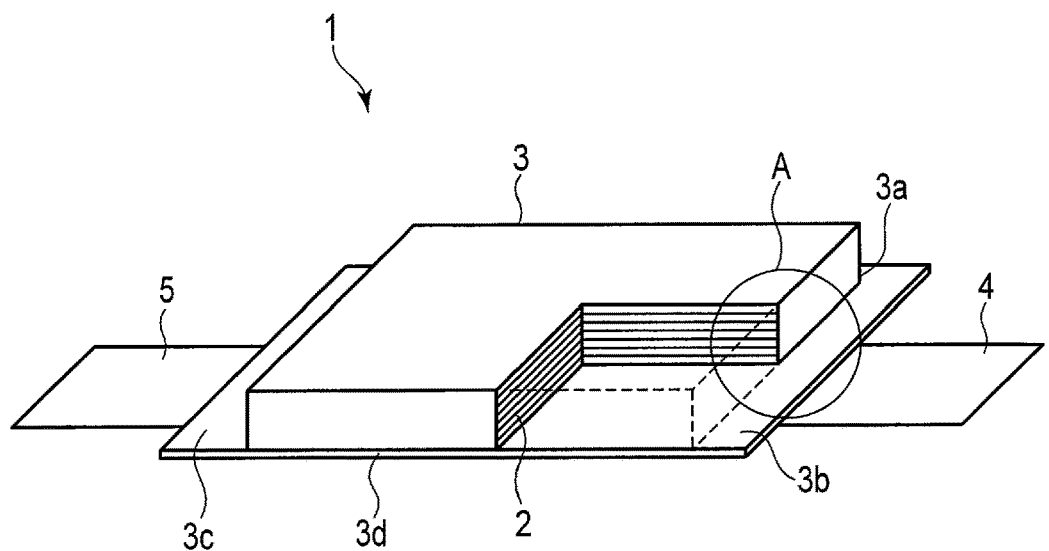
FIG. 3 is a partially cutaway schematic perspective view of an example of a nonaqueous electrolyte battery according to a third embodiment.
Figure 4:
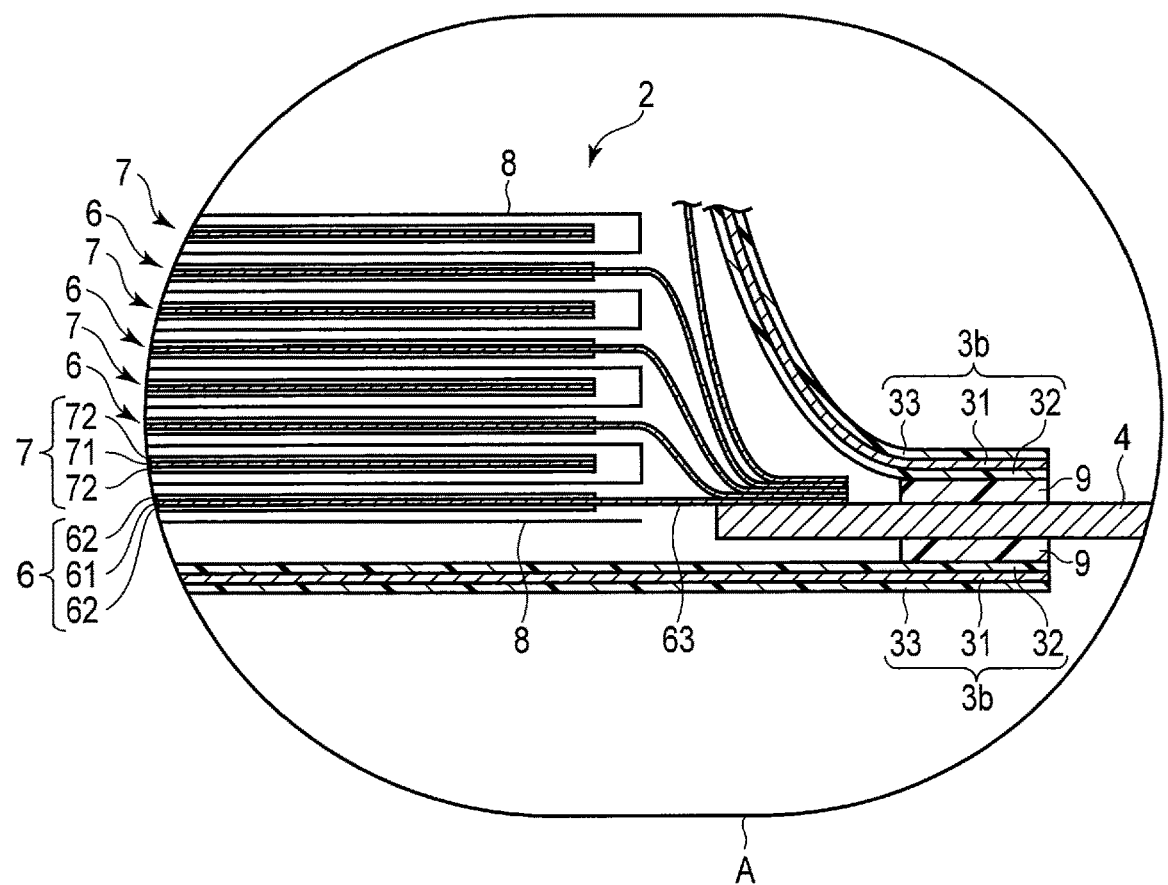
FIG. 4 is a schematic cross-sectional view of a part A shown in FIG. 3.

FIG. 3 is a schematic cutaway perspective view of an example of a nonaqueous electrolyte battery according to the third embodiment. FIG. 4 is a schematic cross-sectional view of the part A shown in FIG. 3.

An example nonaqueous electrolyte battery 1 as shown in FIGS. 3 and 4 includes an electrode group 2 as shown in FIGS. 3 and 4, a container 3 as shown in FIGS. 3 and 4, a positive electrode current collector tab 4 as shown in FIGS. 3 and 4, and a negative electrode current collector tab 5 as shown in FIG. 3.

The electrode group 2 as shown in FIGS. 3 and 4 includes a plurality of positive electrodes 6, a plurality of negative electrodes 7, and one separator 8.

The positive electrodes 6 have the same structure as that of the positive electrodes 6 described with reference to FIG. 1. That is, as shown in FIG. 4, each of the positive electrodes 6 includes a positive electrode current collector 61 and positive electrode active material-containing layers 62 formed on both surfaces of the positive electrode current collector 61. Further, the positive electrode current collector 61 includes a portion 63 having a surface on which the positive electrode active material-containing layer 62 is not formed, and this portion 63 functions as a positive electrode lead.

The negative electrodes 7 have the same structure as that of the negative electrodes 7 included in the electrode group 2 described with reference to FIG. 2. That is, as shown in FIG. 4, each of the negative electrodes 7 includes a negative electrode current collector 71 and negative electrode active material containing layers 72 formed on both surfaces of the negative electrode current collector 71. Further, although not shown, the negative electrode current collector 71 includes a portion having a surface on which the negative electrode active material-containing layer 72 is not formed, and this portion functions as a negative electrode lead.

As shown in FIG. 4, the separator 8 is folded in a zigzag shape like the separator 8 included in the electrode group 2 shown in FIG. 2. The positive electrode 6 or the negative electrode 7 is arranged in a space defined by the mutually facing surfaces of the separator 8 folded in a zigzag shape. Thus, as shown in FIG. 4, the positive electrode 6 and the negative electrode 7 are stacked so that the positive electrode active material-containing layer 62 and the negative electrode active material-containing layer 72 face each other with the separator 8 interposed therebetween. Thus, the electrode group 2 is formed.

The positive electrode leads 63 of the electrode group 2 extend from the electrode group 2 as shown in FIG. 4. As shown in FIG. 4, these positive electrode leads 63 are gathered together and connected to the positive electrode current collector tab 4. Although not shown, the negative electrode leads of the electrode group 2 also extend from the electrode group 2. Although not shown, these negative electrode leads are gathered together and connected to the negative electrode current collector tab 5 shown in FIG. 3.

Such an electrode group 2 is housed in the container 3 as shown in FIGS. 3 and 4.

The container 3 is formed of an aluminum-containing laminate film including an aluminum foil 31 and resin films 32 and 33 formed on both surfaces of the aluminum foil 31. The aluminum-containing laminate film forming the container 3 is bent so that the resin film 32 faces inward with a bent part 3d as a fold, for housing the electrode group 2. Further, as shown in FIGS. 3 and 4, the container 3 sandwiches the positive electrode current collector tab 4 at a peripheral edge part 3b. Similarly, the container 3 sandwiches the negative electrode current collector tab 5 at a peripheral edge part 3c. As a result, the positive electrode current collector tab 4 and the negative electrode current collector tab 5 extend from the container 3 in directions opposite to each other.

The peripheral edge parts 3a, 3b and 3c of the container 3 excluding the portions sandwiching the positive electrode current collector tab 4 and the negative electrode current collector tab 5 are heat-sealed by heat fusion of the resin films 32 facing each other.

Further, in the nonaqueous electrolyte battery 1, in order to improve the bonding strength between the positive electrode current collector tab 4 and the resin films 32, insulating films 9 are provided between the positive electrode current collector tab 4 and the resin films 32, as shown in FIG. 4. Further, at the peripheral edge part 3b, the positive electrode current collector tab 4 and the insulating films 9 are heat-fused, and the resin films 32 and the insulating films 9 are heat-sealed by heat fusion. Similarly, although not shown, the insulating films 9 are also provided between the negative electrode current collector tab 5 and the resin films 32. Further, at the peripheral edge parts 3c, the negative electrode current collector tab 5 and the insulating films 9 are heat-fused, and the resin films 32 and the insulating films 9 are heat-fused. That is, in the nonaqueous electrolyte battery 1 as shown in FIGS. 3 and 4, all of the peripheral edge parts 3a, 3b and 3c of the container 3 are heat-sealed.

The container 3 further contains a nonaqueous electrolyte (not shown). The nonaqueous electrolyte is impregnated into the electrode group 2.

The nonaqueous electrolyte battery according to the third embodiment includes the electrode group according to the second embodiment, and thus can exhibit excellent cycle life performance.

EXAMPLES

Examples will be described below. The particle size distribution of the material powder described below was measured by the same procedures as those of the method for measuring the particle size distributions of the positive electrode active material-containing layer and the negative electrode active material-containing layer described above.

Example 1

In Example 1, a positive electrode, an electrode group and a nonaqueous electrolyte battery were produced by the following procedures.

[Production of Positive Electrode]

As the positive electrode active material, lithium manganate powder having a particle diameter D10 of 1.2 μm, an average particle diameter D50 of 3.5 μm and a particle diameter D90 of 8.5 μm was prepared. This lithium manganate had a composition represented by $LiMn_2O_4$ and also had a spinel type crystal structure. That is, lithium manganate was used as the first positive electrode active material.

On the other hand, acetylene black powder having D10 of 0.2 μm, D50 of 0.8 μm and D90 of 3.2 μm was prepared as the conductive agent. The particle size distribution was measured by the same procedures as those of the method for measuring the particle size distributions of the positive electrode active material-containing layer and the negative electrode active material-containing layer described above.

Next, lithium manganate powder, acetylene black powder, and polyvinylidene fluoride were mixed in a weight ratio of 100:4:1 by the following procedures. First, lithium manganate powder and acetylene black were dry-mixed using a Henschel mixer. After dry-mixing, polyvinylidene fluoride and N-methyl-2-pyrrolidone were added to the obtained dry mixture, and the mixture was wet-mixed with a planetary mixer. In this way, a mixture containing the materials in the above ratio was prepared.

Subsequently, the prepared mixture was put into a rotating/revolving mixer, Rentaro (ARE-250) manufactured by THINKY, and stirred for 30 minutes at a rotation speed of 2000 rpm. Thus, a positive electrode slurry was obtained.

The positive electrode slurry obtained after stirring was applied to both surfaces of an aluminum foil having a thickness of 20 μm by a coater so that the coating amount per unit area was 50 g/m² on one surface. At this time, a portion of the aluminum foil not applied with the slurry was left. The obtained coating film was dried and then rolled by a roll press machine so that the electrode density dc (not including current collector) was 2.8 g/cm³. Finally, the portion not applied with the slurry was punched out to form a narrow part as the positive electrode lead. The planar shape of the narrow part was similar to that of the positive electrode lead 63 of the positive electrode 6 shown in FIG. 1, for example. Thus, a plurality of positive electrodes of Example 1 were produced.

[Production of Negative Electrode]

As the negative electrode active material, lithium titanate powder having a particle diameter D10 of 0.4 μm, an average particle diameter D50 of 0.9 μm and a particle diameter D90 of 2.9 μm was prepared. This lithium titanate had a composition represented by $Li_4Ti_5O_{12}$ and also had a spinel type crystal structure. That is, lithium titanate was used as the first negative electrode active material.

On the other hand, acetylene black powder having D10 of 0.2 μm, D50 of 0.8 μm and D90 of 3.2 μm was prepared as the conductive agent. The particle size distribution was measured by the same procedures as those of the method for measuring the particle size distributions of the positive electrode active material-containing layer and the negative electrode active material-containing layer described above.

Next, lithium titanate powder, acetylene black powder, and polyvinylidene fluoride were mixed in a weight ratio of 100:4:1 to obtain a mixture. Then, this mixture was kneaded using N-methyl-2-pyrrolidone as a solvent to obtain a mixture. Then, a negative electrode slurry was prepared by stirring this mixture.

The obtained negative electrode slurry was applied to both surfaces of an aluminum foil having a thickness of 20 μm by a coater so that the coating amount per unit area was 50 g/m² on one surface. At this time, a portion of the aluminum foil not applied with the slurry was left. The obtained coating film was dried and then rolled by a roll press machine so that the electrode density da (not including current collector) was 2.0 g/cm³. As is the case with the positive electrode, a portion not coated with the slurry was punched out to form a narrow part as the negative electrode lead similar to that of the positive electrode. Thus, a plurality of negative electrodes were produced.

[Production of Electrode Group]

A microporous membrane separator made of cellulose was prepared. This separator had a band-like shape and also had a thickness of 30 μm. This separator was folded in a zigzag shape, for example, as shown in FIG. 2. Then, in the same manner as described with reference to FIG. 2, the positive electrodes of Example 1 and the negative electrodes produced above were alternately arranged in the spaces defined by the mutually facing portions of the separator. At this time, the plurality of positive electrode leads and the plurality of negative electrode leads were allowed to extend from the stack in directions opposite to each other. Thus, a stack including the positive electrodes, the negative electrodes, and the separator was obtained.

Finally, a winding stop tape was adhered onto the obtained stack to obtain an electrode group of Example 1 having a stack structure.

[Connection of Positive Electrode Current Collector Tab and Negative Electrode Current Collector Tab to Electrodes]

On the other hand, a positive electrode current collector tab and a negative electrode current collector tab were produced using aluminum. Subsequently, the positive electrode leads of the plurality of positive electrodes were gathered together and connected to the positive electrode current collector tab. Similarly, the negative electrode leads of the plurality of negative electrodes were gathered together and connected to the negative electrode current collector tab. In this way, the positive electrode current collector tab and the negative electrode current collector tab were arranged so as to extend in opposite directions to each other from the electrode group so that current collection from the positive electrode and the negative electrode could be easily carried out.

[Production of Container]

An aluminum-containing laminate film was prepared as a container. Then, the aluminum-containing laminate film was formed into a shape in which the electrode group of Example 1 could be accommodated. The electrode group of Example 1 was housed in the aluminum-containing laminate film thus formed. At this time, for example, as shown in FIG. 3, the positive electrode current collector tab was sandwiched between the resin films at one peripheral edge part of the container. Similarly, the negative electrode current collector tab was sandwiched between the resin films at another peripheral edge part of the container. Reinforcing insulating films for enhancing strength were arranged between the positive electrode current collector tab and the resin films and between the negative electrode current collector tab and the resin films.

Subsequently, the portions of the resin films, which faced and were in contact with each other at the peripheral edge parts, were fixed by heat fusion, leaving a portion thereof. At the same time, at one peripheral edge part, the resin films and the reinforcing insulating films which were in contact therewith are fixed by heat fusion, and the positive electrode current collector tab and the reinforcing insulating films which were in contact therewith are fixed by heat fusion. Similarly, at one peripheral edge part, the resin films and the reinforcing insulating films which were in contact therewith are fixed by heat fusion, and the negative electrode current collector tab and the reinforcing insulating films which were in contact therewith are fixed by heat fusion. Thus, a cell before liquid injection was prepared.

[Injection of Nonaqueous Electrolyte]

A nonaqueous electrolyte was prepared by the following procedures.

First, ethylene carbonate and dimethyl carbonate were mixed in a volume ratio of 1:1 to prepare a solvent mixture as a nonaqueous solvent. Next, lithium hexafluorophosphate $LiPF_6$ as an electrolyte was dissolved in this solvent mixture at a concentration of 2 mol/l. Thus, a nonaqueous electrolyte was prepared.

This nonaqueous electrolyte was injected into the cell before liquid injection described above. The nonaqueous electrolyte was injected through the portion of the peripheral edge parts of the container, which was left without being heat-fused.

[Production of Nonaqueous Electrolyte Battery]

Finally, the portion of the peripheral edge parts of the container, which was left without being heat-fused, was heat-fused. Thus, a nonaqueous electrolyte battery of Example 1 was produced.

[Evaluation]

(Cycle Life Performance Test)

The cycle life performance of the nonaqueous electrolyte battery of Example 1 produced as described above was evaluated by the following procedures.

The nonaqueous electrolyte battery of Example 1 was subjected to 3000 charge and discharge cycles in an environment at 60° C. At this time, both charge and discharge were performed at a current value of 10 C. The discharge capacity at the first cycle (one charge/discharge) and the discharge capacity at the 3000th cycle were measured.

A value obtained by dividing the thus-obtained capacity at 3000th cycle by the capacity at first cycle was determined as the capacity retention rate after 3000 cycles.

The capacity retention rate of the nonaqueous electrolyte battery of Example 1 after 3000 cycles was 97%.

(Measurement of Pore Distribution and Particle Size Distribution)

The pore distribution and particle size distribution of the positive electrode active material-containing layer of the positive electrode of Example 1 included in the nonaqueous electrolyte battery of Example 1, the pore distribution and particle size distribution of the negative electrode active material-containing layer of the negative electrode included in the nonaqueous electrolyte battery of Example 1, and the pore distribution of the separator included in the nonaqueous electrolyte battery of Example 1 were measured according to the procedures described above.

<Pore Volume a1, Pore Specific Surface Area a2 and Median Diameter a3 of Positive Electrode Active Material-Containing Layer>

The pore volume a1, the pore specific surface area a2, and the median diameter a3 in the pore distribution were obtained using the pore distribution of the positive electrode active material-containing layer by the mercury intrusion porosimetry. As a result, it was found that the pore volume a1 was 0.116 mL/g, that the pore specific surface area a2 was 11.4 m$^2$/g, and that the median diameter a3 was 0.047 μm.

<Pore Volume b1, Pore Specific Surface Area b2 and Median Diameter b3 of Negative Electrode Active Material-Containing Layer>

The pore volume b1, the pore specific surface area b2, and the median diameter b3 in the pore distribution were obtained using the pore distribution of the negative electrode active material-containing layer by the mercury intrusion porosimetry. As a result, it was found that the pore volume b1 was 0.125 mL/g, that the pore specific surface area b2 was 9.6 m$^2$/g, and that the median diameter b3 was 0.066 μm.

<Pore Distribution>

FIG. 5 shows the pore distribution (solid line) of the positive electrode active material-containing layer and the pore distribution (broken line) of the negative electrode active material-containing layer, produced in Example 1.

As is clear from FIG. 5, in Example 1, it can be seen that the median diameter a3 in the pore distribution of the positive electrode active material-containing layer and the median diameter b3 in the pore distribution of the negative electrode active material-containing layer were close to each other, for example, taking the spread of the pore distribution of the positive electrode active material-containing layer and the spread of the pore distribution of the negative electrode active material-containing layer into consideration.

<Relationship Between Positive Electrode and Negative Electrode>

From the above results, the pore volume ratio a1/b1, the pore specific surface area ratio a2/b2, and the median diameter ratio a3/b3 were calculated. For Example 1, the ratios were a1/b1:0.93, a2/b2:1.19 and a3/b3:0.71.

<Median Diameter c3 in Pore Distribution of Separator>

The median diameter c3 in the pore distribution of the separator included in the nonaqueous electrolyte battery of Example 1 by the mercury intrusion porosimetry was 1.0 μm.

<Particle Size Distribution of Positive Electrode Active Material-Containing Layer>

FIG. 6 shows the particle size distribution of the positive electrode active material-containing layer (positive electrode active material-containing layer specimen obtained by peeling off the positive electrode active material-containing layer of the positive electrode incorporated in the nonaqueous electrolyte battery). In this particle size distribution, the particle diameter D10 was 0.8 μm, the average particle diameter D50 was 3.1 μm, and the particle diameter D90 was 7.1 μm.

<Particle Size Distribution of Negative Electrode Active Material-Containing Layer>

In the particle size distribution of the negative electrode active material-containing layer (negative electrode active material-containing layer specimen obtained by peeling off the negative electrode active material-containing layer of the negative electrode incorporated in the nonaqueous electrolyte battery), the particle diameter D10 is 0.2 μm, the average particle diameter D50 was 0.6 μm, and the particle diameter D90 was 2.4 μm.

Example 2

In Example 2, a positive electrode was produced by the same procedures as in Example 1 except that the positive electrode active material was changed. In Example 2, lithium manganate powder having a particle diameter D10 of 0.6 μm, an average particle diameter D50 of 2.4 μm, and a particle diameter D90 of 5.1 μm was used as the positive electrode active material. The lithium manganate used had a composition represented by $LiMn_2O_4$ and also had a spinel type crystal structure. That is, lithium manganate was used as the first positive electrode active material. Further, an electrode group and a nonaqueous electrolyte battery were produced by the same procedures as in Example 1 except that the positive electrode of Example 2 was used.

Example 3

In Example 3, a positive electrode was produced by the same procedures as in Example 1 except that the positive electrode active material was changed. In Example 3, lithium manganate powder having a particle diameter D10 of 1.2 μm, an average particle diameter D50 of 3.5 μm, and a particle diameter D90 of 6.9 μm, and lithium cobaltate powder having a particle diameter D10 of 2.5 μm, an average particle diameter D50 of 6.1 μm, and a particle diameter D90 of 10.8 μm were used as the positive electrode active materials. The lithium manganate used had a composition represented by $LiMn_2O_4$ and also had a spinel type crystal structure. The lithium cobaltate used had a composition of $LiCoO_2$, but did not have a spinel type crystal structure. Lithium manganate and lithium cobaltate were mixed in a weight ratio of 78:22 to obtain a powder mixture. This powder mixture was used as the positive electrode active material. That is, lithium manganate was used as the first positive electrode active material, and lithium cobaltate was used as the second positive electrode active material. Further, an electrode group and a nonaqueous electrolyte battery were produced by the same procedures as in Example 1 except that the positive electrode of Example 3 was used.

Example 4

In Example 4, a positive electrode was produced by the same procedures as in Example 1 except that rolling in the production of a positive electrode was performed such that the electrode density dc of the positive electrode active material-containing layer (not including the current collector) was made to 3.5 g/cm³. Further, an electrode group and a nonaqueous electrolyte battery were produced by the same procedures as in Example 1 except that the positive electrode of Example 4 was used.

Example 5

In Example 5, a positive electrode was produced by the same procedures as in Example 1. Further, in Example 5, a plurality of negative electrodes were produced by the same procedures as in Example 1, except that rolling in the production of the negative electrode was performed such that the electrode density da of the negative electrode active material-containing layer (not including the current collector) was made to 2.5 g/cm³. Further, an electrode group and a nonaqueous electrolyte battery were produced by the same procedures as in Example 1 except that these negative electrodes were used.

Example 6

In Example 6, a positive electrode was produced by the same procedures as in Example 1 except that the positive electrode active material was changed. In Example 6, lithium manganate powder having a particle diameter D10 of 1.9 μm, an average particle diameter D50 of 5.8 μm, and a particle diameter D90 of 12.4 μm was used as the positive electrode active material. The lithium manganate used had a composition represented by $LiMn_2O_4$ and also had a spinel type crystal structure. That is, lithium manganate was used as the first positive electrode active material. Further, an electrode group and a nonaqueous electrolyte battery were produced by the same procedures as in Example 1 except that the positive electrode of Example 6 was used.

Example 7

In Example 7, a positive electrode was produced by the same procedures as in Example 1. Also, in Example 7, a negative electrode was produced by the same procedures as in Example 1 except that the negative electrode active material was changed. In Example 7, lithium titanate powder having a particle diameter D10 of 1.5 μm, an average particle diameter D50 of 4.4 μm, and a particle diameter D90 of 7.3 μm was used as the negative electrode active material. This lithium titanate had a composition represented by $Li_4Ti_5O_{12}$ and also had a spinel type crystal structure. That is, lithium titanate was used as the first negative electrode active material. Further, an electrode group and a nonaqueous electrolyte battery were produced by the same procedures as in Example 1 except that these negative electrodes were used.

Example 8

In Example 8, a positive electrode was produced by the same procedures as in Example 1 except that the positive electrode active material was changed. In Example 8, Mg-added lithium manganate powder having a particle diameter D10 of 1.4 μm, an average particle diameter D50 of 3.8 μm, and a particle diameter D90 of 8.9 μm was used as the positive electrode active material. This Mg-added lithium manganate had a composition represented by $LiMn_{1.8}Mg_{0.2}O_4$ and also had a spinel type crystal structure. This Mg-added lithium manganate is a composite oxide in which a different element Mg (magnesium) is added to lithium manganate $LiMn_2O_4$. That is, Mg-added lithium manganate was used as the first positive electrode active material. Further, an electrode group and a nonaqueous electrolyte battery were produced by the same procedures as in Example 1 except that the positive electrode of Example 8 was used.

Comparative Example 1

In Comparative Example 1, a positive electrode was produced by the same procedures as in Example 1 except that the positive electrode active material was changed. In Comparative Example 1, lithium cobaltate powder having a particle diameter D10 of 1.4 μm, an average particle diameter D50 of 3.8 μm, and a particle diameter D90 of 9.2 μm was used as the positive electrode active material. The lithium cobaltate used had a composition of $LiCoO_2$, but did not have a spinel type crystal structure. That is, the first positive electrode active material was not used. Further, an electrode group and a nonaqueous electrolyte battery were produced by the same procedures as in Example 1 except that the positive electrode of Comparative Example 1 was used.

Comparative Example 2

In Comparative Example 2, a positive electrode was produced by the same procedures as in Example 1 except that the positive electrode active material was changed. In Comparative Example 2, lithium manganate powder having a particle diameter D10 of 4.3 µm, an average particle diameter D50 of 12.8 µm, and a particle diameter D90 of 28.9 µm was used as the positive electrode active material. The lithium manganate used had a composition represented by $LiMn_2O_4$ and also had a spinel type crystal structure. That is, lithium manganate was used as the first positive electrode active material. Further, an electrode group and a nonaqueous electrolyte battery were produced by the same procedures as in Example 1 except that the positive electrode of Comparative Example 2 was used.

Comparative Example 3

In Comparative Example 3, a positive electrode was produced by the same procedures as in Example 1. Also, in Comparative Example 3, a negative electrode was produced by the same procedures as in Example 1 except that the negative electrode active material was changed. In Comparative Example 3, lithium titanate powder having a particle diameter D10 of 2.8 µm, an average particle diameter D50 of 5.7 µm, and a particle diameter D90 of 12.4 µm was used as the negative electrode active material. This lithium titanate had a composition represented by $Li_4Ti_5O_{12}$ and also had a spinel type crystal structure. That is, lithium titanate was used as the first negative electrode active material. Further, an electrode group and a nonaqueous electrolyte battery were produced by the same procedures as in Example 1 except that these negative electrodes were used.

Comparative Example 4

In Comparative Example 4, a positive electrode was produced by the same procedures as in Example 1. Also, in Comparative Example 4, a negative electrode was produced by the same procedures as in Example 1 except that the negative electrode active material was changed. In Comparative Example 4, graphite powder having a particle diameter D10 of 6.5 µm, an average particle diameter D50 of 16.7 µm, and a particle diameter D90 of 45.1 µm was used as the negative electrode active material. This carbon did not have a spinel type crystal structure. That is, the first negative electrode active material was not used. Further, an electrode group and a nonaqueous electrolyte battery were produced by the same procedures as in Example 1 except that these negative electrodes were used.

Comparative Example 5

In Comparative Example 5, a positive electrode was produced by the same procedures as in Example 1 except that rolling was performed in the production of a positive electrode such that the electrode density dc of the positive electrode active material-containing layer (not including the current collector) was made to 1.8 g/cm³. Further, an electrode group and a nonaqueous electrolyte battery were produced by the same procedures as in Example 1 except that the positive electrode of Comparative Example 5 was used.

Comparative Example 6

In Comparative Example 6, a positive electrode was produced by the same procedures as in Example 1. Further, in Comparative Example 6, a plurality of negative electrodes were produced by the same procedures as in Example 1, except that rolling in the production of the negative electrode was performed such that the electrode density da of the negative electrode active material-containing layer (not including the current collector) was made to 1.2 g/cm³. Further, an electrode group and a nonaqueous electrolyte battery were produced by the same procedures as in Example 1 except that these negative electrodes were used.

Tables 1 and 2 below collectively show the type of the positive electrode active material used and the weight proportion of the first positive electrode active material in the positive electrode active material (Table 1), and the type of the negative electrode active material used and the weight proportion of the first negative electrode active material in the negative electrode active material (Table 2), for Examples 1 to 8 and Comparative. Examples 1 to 6.

TABLE 1

| | Positive electrode active material | | Weight proportion of first positive electrode active material in positive electrode active material [wt %] |
|---|---|---|---|
| | First positive electrode active material | Second positive electrode active material | |
| Example 1 | Lithium manganate | — | 100 |
| Example 2 | Lithium manganate | — | 100 |
| Example 3 | Lithium manganate | Lithium cobaltate | 78 |
| Example 4 | Lithium manganate | — | 100 |
| Example 5 | Lithium manganate | — | 100 |
| Example 6 | Lithium manganate | — | 100 |
| Example 7 | Lithium manganate | — | 100 |
| Example 8 | Lithium manganate (Mg-added) | — | 100 |
| Comparative Example 1 | — | Lithium cobaltate | 0 |
| Comparative Example 2 | Lithium manganate | — | 100 |
| Comparative Example 3 | Lithium manganate | — | 100 |
| Comparative Example 4 | Lithium manganate | — | 100 |
| Comparative Example 5 | Lithium manganate | — | 100 |
| Comparative Example 6 | Lithium manganate | — | 100 |

TABLE 2

| | Negative electrode active material | | Weight proportion of first negative electrode active material in negative electrode active material [wt %] |
|---|---|---|---|
| | First negative electrode active material | Second negative electrode active material | |
| Example 1 | Lithium titanate | — | 100 |
| Example 2 | Lithium titanate | — | 100 |
| Example 3 | Lithium titanate | — | 100 |
| Example 4 | Lithium titanate | — | 100 |
| Example 5 | Lithium titanate | — | 100 |
| Example 6 | Lithium titanate | — | 100 |
| Example 7 | Lithium titanate | — | 100 |
| Example 8 | Lithium titanate | — | 100 |
| Comparative Example 1 | Lithium titanate | — | 100 |
| Comparative Example 2 | Lithium titanate | — | 100 |
| Comparative Example 3 | Lithium titanate | — | 100 |
| Comparative Example 4 | — | Graphite | 0 |
| Comparative Example 5 | Lithium titanate | — | 100 |
| Comparative Example 6 | Lithium titanate | — | 100 |

(Evaluation)

The same evaluations as in Example 1 were performed on the nonaqueous electrolyte batteries of Examples 2 to 8 and Comparative Examples 1 to 6. Table 3 shows the parameters of the respective positive electrode active material-containing layers by the mercury intrusion porosimetry and the results of the particle size distribution measurement by the laser diffraction scattering method. Table 4 shows the parameters of the respective negative electrode active material-containing layers by the mercury intrusion porosimetry and the results of the particle size distribution measurement by the laser diffraction scattering method. Table 5 shows the relationship of the parameters by the mercury intrusion porosimetry in each of the nonaqueous electrolyte batteries, and the median diameter c3 in the pore distribution of the separator included in each of the nonaqueous electrolyte batteries by the mercury intrusion porosimetry. Table 6 shows the capacity retention rate of each of the nonaqueous electrolyte batteries after 3000 cycles.

TABLE 3

| | Parameters by mercury intrusion porosimetry | | | | | |
|---|---|---|---|---|---|---|
| | Pore volume a1 [mL/g] | Pore specific surface area a2 [m²/g] | Median diameter a3 [μm] | Particle size distribution | | |
| | | | | D10 [μm] | D50 [μm] | D90 [μm] |
| Example 1 | 0.116 | 11.4 | 0.047 | 0.8 | 3.1 | 7.1 |
| Example 2 | 0.167 | 13.3 | 0.034 | 0.4 | 1.8 | 3.6 |
| Example 3 | 0.122 | 11.1 | 0.052 | 0.9 | 3.4 | 8.8 |
| Example 4 | 0.089 | 12.8 | 0.041 | 0.6 | 2.8 | 6.4 |
| Example 5 | 0.116 | 11.4 | 0.047 | 0.8 | 3.1 | 7.1 |
| Example 6 | 0.114 | 3.8 | 0.140 | 1.3 | 3.9 | 9.2 |
| Example 7 | 0.116 | 11.4 | 0.047 | 0.8 | 3.1 | 7.1 |
| Example 8 | 0.119 | 11.0 | 0.049 | 1.0 | 3.3 | 8.4 |
| Comparative Example 1 | 0.121 | 11.8 | 0.044 | 0.9 | 3.2 | 7.5 |
| Comparative Example 2 | 0.104 | 2.9 | 0.260 | 3.2 | 11.9 | 25.6 |
| Comparative Example 3 | 0.116 | 11.4 | 0.047 | 0.8 | 3.1 | 7.1 |
| Comparative Example 4 | 0.116 | 11.4 | 0.047 | 0.8 | 3.1 | 7.1 |
| Comparative Example 5 | 0.245 | 3.4 | 0.295 | 1.1 | 3.4 | 7.8 |
| Comparative Example 6 | 0.116 | 11.4 | 0.047 | 0.8 | 3.1 | 7.1 |

TABLE 4

| | Parameters by mercury intrusion porosimetry | | | | | |
|---|---|---|---|---|---|---|
| | Pore volume b1 [mL/g] | Pore specific surface area b2 [m²/g] | Median diameter b3 [μm] | Particle size distribution | | |
| | | | | D10 [μm] | D50 [μm] | D90 [μm] |
| Example 1 | 0.125 | 9.6 | 0.066 | 0.2 | 0.6 | 2.4 |
| Example 2 | 0.125 | 9.6 | 0.066 | 0.2 | 0.6 | 2.4 |
| Example 3 | 0.125 | 9.6 | 0.066 | 0.2 | 0.6 | 2.4 |
| Example 4 | 0.125 | 9.6 | 0.066 | 0.2 | 0.6 | 2.4 |
| Example 5 | 0.109 | 11.2 | 0.057 | 0.1 | 0.5 | 2.2 |
| Example 6 | 0.125 | 9.6 | 0.066 | 0.2 | 0.6 | 2.4 |
| Example 7 | 0.122 | 8.2 | 0.091 | 0.9 | 2.5 | 4.7 |
| Example 8 | 0.125 | 9.6 | 0.066 | 0.2 | 0.6 | 2.4 |
| Comparative Example 1 | 0.125 | 9.6 | 0.066 | 0.2 | 0.6 | 2.4 |
| Comparative Example 2 | 0.125 | 9.6 | 0.066 | 0.2 | 0.6 | 2.4 |
| Comparative Example 3 | 0.121 | 5.7 | 0.136 | 2.2 | 4.9 | 10.5 |
| Comparative Example 4 | 0.128 | 3.6 | 0.220 | 5.9 | 15.1 | 40.2 |
| Comparative Example 5 | 0.125 | 9.6 | 0.066 | 0.2 | 0.6 | 2.4 |
| Comparative Example 6 | 0.267 | 4.7 | 0.145 | 0.3 | 0.7 | 2.9 |

TABLE 5

| | Relationship between parameters | | | Median diameter c3 in pore distribution of separator [μm] |
|---|---|---|---|---|
| | Ratio a1/b1 | Ratio a2/b2 | Ratio a3/b3 | |
| Example 1 | 0.93 | 1.19 | 0.71 | 1.0 |
| Example 2 | 1.34 | 1.39 | 0.52 | 1.0 |
| Example 3 | 0.98 | 1.16 | 0.79 | 1.0 |
| Example 4 | 0.71 | 1.33 | 0.62 | 1.0 |
| Example 5 | 1.06 | 1.02 | 0.82 | 1.0 |

TABLE 5-continued

| | Relationship between parameters | | | Median diameter c3 in pore distribution of separator [μm] |
|---|---|---|---|---|
| | Ratio a1/b1 | Ratio a2/b2 | Ratio a3/b3 | |
| Example 6 | 0.91 | 0.40 | 2.12 | 1.0 |
| Example 7 | 0.95 | 1.39 | 0.52 | 1.0 |
| Example 8 | 0.95 | 1.15 | 0.74 | 1.0 |
| Comparative Example 1 | 0.97 | 1.23 | 0.67 | 1.0 |
| Comparative Example 2 | 0.83 | 0.30 | 3.94 | 1.0 |
| Comparative Example 3 | 0.96 | 2.00 | 0.35 | 1.0 |
| Comparative Example 4 | 0.91 | 3.17 | 0.21 | 1.0 |
| Comparative Example 5 | 1.96 | 0.35 | 4.47 | 1.0 |
| Comparative Example 6 | 0.43 | 2.43 | 0.32 | 1.0 |

TABLE 6

| | Cycle capacity retention rate [%] |
|---|---|
| Example 1 | 97 |
| Example 2 | 95 |
| Example 3 | 92 |
| Example 4 | 94 |
| Example 5 | 95 |
| Example 6 | 92 |
| Example 7 | 91 |
| Example 8 | 93 |
| Comparative Example 1 | 74 |
| Comparative Example 2 | 65 |
| Comparative Example 3 | 69 |
| Comparative Example 4 | 34 |
| Comparative Example 5 | 63 |
| Comparative Example 6 | 65 |

[Results]

As is clear from the results shown in Table 6, the nonaqueous electrolyte batteries of Examples 1 to 8 each showed a higher capacity retention rate after 3000 cycles, i.e., excellent cycle life performance than those of the nonaqueous electrolyte batteries of Comparative Examples 1 to 6. In these batteries, the positive electrode active material-containing layer contained the first positive electrode active material having a spinel type crystal structure, and the negative electrode active material-containing layer contained the first negative electrode active material having a spinel type crystal structure. The electrode group of each of the Examples satisfied (1) $0.5 \leq a1/b1 \leq 1.5$; (2) $0.4 \leq a2/b2 \leq 1.4$; and (3) $0.5 \leq a3/b3 \leq 2.3$. Therefore, it is considered that each of the positive electrodes of Examples 1 to 8 could exhibit charge transfer resistance on a same level with that of the negative electrode in each of the nonaqueous electrolyte batteries. As a result, it is considered that the nonaqueous electrolyte batteries including the positive electrodes of Examples 1 to 8 could prevent overvoltage from being applied to the positive electrode and the negative electrode at the initial and final stages of charge and discharge, and could exhibit excellent cycle life performance.

In particular, in the battery of Example 1, it is considered that the positive electrode and the negative electrode could exhibit closer values for the charge transfer resistance and the lithium diffusion resistance. It is also considered that this is the reason why the battery of Example 1 could exhibit a good cycle capacity retention rate of 97%.

Example 2 is an example in which lithium manganate having a smaller particle diameter than that of Example 1 was used as the first positive electrode active material. As a result, as is clear from Table 3, the pore volume a1, the pore specific surface area a2, and the median diameter a3 in the pore distribution of the positive electrode active material-containing layer changed from those of Example 1. Therefore, as shown in Table 5, in Example 2, the values of the ratio a1/b1, the ratio a2/b2 and the ratio a3/b3 were respectively different from those of Example 1, but satisfied the above formulas (1), (2) and (3). Therefore, also in the battery of Example 2, it is considered that the positive electrode and the negative electrode could exhibit closer values for the charge transfer resistance and the lithium diffusion resistance. It is also considered that this is the reason why the battery of Example 2 could exhibit a good cycle capacity retention rate of 95%. Further, from the results of Example 2, even the battery of Example 2 using manganese lithium having a smaller particle diameter than that of Example 1 could show excellent cycle life performance, similarly to the battery of Example 1.

Example 3 is an example in which 22% by weight of the weight of the positive electrode active material was lithium cobaltate and the weight proportion of the first positive electrode active material was reduced as compared with that of Example 1. As shown in Table 5, the values of the ratio a1/b1, the ratio a2/b2, and the ratio a3/b3 satisfied the above formulas (1), (2), and (3) also in Example 3. Therefore, also in the battery of Example 3, it is considered that the positive electrode and the negative electrode could exhibit closer values for the charge transfer resistance and the lithium diffusion resistance. It is also considered that this is the reason why the battery of Example 3 could exhibit a high cycle capacity retention rate of 92%.

Example 4 is an example in which the density dc of the positive electrode active material-containing layer was higher than that of Example 1. In Example 4, as is clear from Table 3, the pore volume a1 and the median diameter a3 in the pore distribution of the positive electrode active material-containing layer were small, and the pore specific surface area a2 was large, as compared with those of Example 1. Thus, as shown in Table 5, the values of the ratio a1/b1, the ratio a2/b2 and the ratio a3/b3 were respectively different from those of Example 1, but satisfied the above formulas (1), (2) and (3) in Example 4. Therefore, also in the battery of Example 4, it is considered that the positive electrode and the negative electrode could exhibit closer values for the charge transfer resistance and the lithium diffusion resistance. It is also considered that this is the reason why the battery of Example 4 could exhibit a good cycle capacity retention rate of 94%.

Example 5 is an example in which the negative electrode to be combined with the positive electrode produced by the same procedures as in Example 1 was different from that of Example 1. Specifically, in Example 5, the density da of the negative electrode active material-containing layer was increased as compared with that of Example 1. As a result, in Example 5, as is clear from Table 4, the pore volume b1 and the median diameter b3 in the pore distribution of the negative electrode active material-containing layer were small, and the pore specific surface area b2 was large, as compared with those of Example 1. Thus, as shown in Table 5, the values of the ratio a1/b1, the ratio a2/b2 and the ratio a3/b3 were respectively different from those of Example 1, but satisfied the above formulas (1), (2) and (3) in Example 5. Therefore, also in the battery of Example 5, it is considered that the positive electrode and the negative electrode could exhibit closer values for the charge transfer resistance and the lithium diffusion resistance. It is considered that this is the reason why the battery of Example 5 could exhibit a good cycle capacity retention rate of 95%.

Example 6 is an example in which lithium manganate having a larger particle diameter than that of Example 1 was used as the first positive electrode active material. Thus, as shown in Table 3, the particle diameters D10, D50 and D90 of the mixture of the particles of the positive electrode active material and the particles of the conductive agent contained in the positive electrode active material-containing layer were changed from those of Example 1, and the pore specific surface area a2 was smaller and the median diameter a3 in the pore distribution was larger than those of Example 1. Thus, as shown in Table 5, the values of the ratio alibi, the ratio a2/b2 and the ratio a3/b3 were respectively different from those of Example 1, but satisfied the above formulas (1), (2) and (3) in Example 6. Therefore, also in the battery of Example 6, it is considered that the positive electrode and the negative electrode could exhibit closer values for the charge transfer resistance and the lithium diffusion resistance. It is considered that this is the reason why the battery of Example 6 could exhibit a good cycle capacity retention rate of 92%.

Example 7 is an example in which the negative electrode to be combined with the positive electrode produced by the same procedures as in Example 1 was different. Specifically, in Example 7, lithium titanate having a larger particle diameter than that of Example 1 was used as the first negative electrode active material. Thus, as shown in Table 4, the particle diameters D10, D50 and D90 of the mixture of the particles of the positive electrode active material and the particles of the conductive agent contained in the positive electrode active material-containing layer were changed from those of Example 1, and the pore specific surface area b2 was smaller and the pore median diameter b3 was larger than those of Example 1. Thus, as shown in Table 5, the values of the ratio a1/b1, the ratio a2/b2 and the ratio a3/b3 were respectively different from those of Example 1, but satisfied the above formulas (1), (2) and (3) in Example 7. Therefore, also in the battery of Example 7, it is considered that the positive electrode and the negative electrode could exhibit closer values for the charge transfer resistance and the lithium diffusion resistance. It is considered that this is the reason why the battery of Example 7 could exhibit a good cycle capacity retention rate of 91%.

Example 8 is an example in which lithium manganate added with a different element. Mg (magnesium) was used as the first positive electrode active material. As described above, the first positive electrode active material used in Example 8 had a composition represented by $LiMn_{1.8}Mg_{0.2}O_4$. In Example 8, as shown in Table 5, the values of the ratio alibi, the ratio a2/b2 and the ratio a3/b3 were respectively different from those of Example 1, but satisfied the above formulas (1), (2) and (3). Therefore, also in the battery of Example 7, it is considered that the positive electrode and the negative electrode could exhibit closer values for the charge transfer resistance and the lithium diffusion resistance. It is considered that this is the reason why the battery of Example 8 could exhibit a good cycle capacity retention rate of 93%.

From the comparison among the results of Examples 1, 3 and 8, it can be seen that the batteries of these Examples in which the positive electrode active material-containing layer contained the first positive electrode active material having a spinel type crystal structure could exhibit similarly good cycle life performance, even though they were different in first positive electrode active material, or even though they were different in weight proportion of the first positive electrode active material in the weight of the positive electrode active material.

On the other hand, Comparative Example 1 is an example in which lithium cobaltate was used as the positive electrode active material, but the first positive electrode active material having a spinel type crystal structure was not used. It is considered that, due to this, the diffusion resistances of the positive electrode and the negative electrode were significantly different, and that overvoltage was applied to the positive electrode and/or the negative electrode during the charge and discharge cycle, in the battery of Comparative Example 1. This is considered to be the reason why the cycle capacity retention rate of the battery of Comparative Example 1 was a poor value of 74%. The battery of Comparative Example 1 satisfied the above formulas (1) to (3). From the results of Comparative Example 1, a positive electrode that does not contain the first positive electrode active material having a spinel type crystal structure, even if satisfying the above formulas (1) to (3), cannot realize excellent cycle life performance.

Comparative Example 2 is an example in which lithium manganate having a larger particle diameter than that of Example 6 was used as the positive electrode active material. As a result, as is clear from Table 3, the pore volume a1, the pore specific surface area a2, and the median diameter a3 in the pore distribution, which are results of the pore distribution measurement of the positive electrode active material-containing layer, and the particle diameters D10, D50 and D90 of the positive electrode active material-containing layer changed from those of Example 1. In particular, the pore specific surface area a2 was smaller and the median diameter a3 in the pore distribution was larger than those of Example 1. As a result, the values of the ratio a2/b2 and the ratio a3/b3 did not satisfy the above formula (2) or (3). It is considered that, due to this, the charge transfer resistances of the positive electrode and the negative electrode were significantly different, and that overvoltage was applied to the positive electrode and/or the negative electrode during the charge and discharge cycle, in the battery of Comparative Example 2. This is considered to be the reason why the battery of Comparative Example 2 exhibited a poor cycle capacity retention rate of 65%.

Comparative Example 3 is an example in which the negative electrode to be combined with the positive electrode produced by the same procedures as in Example 1 was different from that of Example 1. Specifically, in Comparative Example 3, lithium titanate having a larger particle diameter than that of Example 1 was used as the negative electrode active material. As a result, as is clear from Table 4, the pore volume b1, the pore specific surface area b2, and the median diameter b3 in the pore distribution obtained from the results of the pore distribution measurement of the negative electrode active material-containing layer, and the particle diameters D10, D50 and D90 of the mixture of the particles of the negative electrode active material and the particles of the conductive agent contained in the negative electrode active material-containing layer changed from those of Example 1. In particular, the pore specific surface area b2 was smaller and the median diameter b3 in the pore distribution was larger than those of Example 1. As a result, the values of the ratio a2/b2 and the ratio a3/b3 did not satisfy the above formula (2) or (3). It is considered that, due to this, the charge transfer resistances of the positive electrode and the negative electrode were significantly different, and that overvoltage was applied to the positive electrode and/or the negative electrode during the charge and discharge cycle, in the battery of Comparative Example 3. This is considered to be the reason why the battery of Comparative Example 3 exhibited a poor cycle capacity retention rate of 69%.

Comparative Example 4 is an example in which the negative electrode to be combined with the positive electrode produced by the same procedures as in Example 1 was different. Specifically, in Comparative Example 4, the negative electrode active material-containing layer did not contain the first negative electrode active material having a spinel type crystal structure. It is considered that, due to this, the charge transfer resistances of the positive electrode and the negative electrode were significantly different, and thus that overvoltage was applied to the positive electrode and/or the negative electrode during the charge and discharge cycle, in the battery of Comparative Example 4. This is considered to be one of the reasons why the battery of Comparative Example 4 exhibited a poor cycle capacity retention rate of 34%. Another factor of the poor capacity retention rate of the battery of Comparative Example 4 is that the operating potential of the negative electrode of the battery of Comparative Example 4 was lower than that of the batteries of the other Examples and Comparative Examples.

Comparative Example 5 is an example in which the density dc of the positive electrode active material-containing layer was lower than that of Example 1. In Comparative Example 5, as is clear from. Table 3, the pore volume a1 and the median diameter a3 in the pore distribution of the positive electrode active material-containing layer were large, and the pore specific surface area a2 was small, as compared with those of Example 1. Thus, as shown in Table 5, the values of the ratio a1/b1, the ratio a2/b2 and the ratio a3/b3 were respectively different from those of Example 1, and did not satisfy the above formula (1), (2) or (3) in Comparative Example 5. It is considered that, due to this, the charge transfer resistances of the positive electrode and the negative electrode were significantly different, and that overvoltage was applied to the positive electrode and/or the negative electrode during the charge and discharge cycle, in the battery of Comparative Example 5. This is considered to be the reason why the battery of Comparative Example 5 exhibited a poor cycle capacity retention rate of 63%.

Comparative Example 6 is an example in which the negative electrode to be combined with the positive electrode produced by the same procedures as in Example 1 was different. Specifically, Comparative Example 6 is an example in which the density da of the negative electrode active material-containing layer was lower than that of Example 1. In Comparative Example 6, the pore volume b1 and the median diameter b3 in the pore distribution of the negative electrode active material layer were large, and the pore specific surface area b2 was small, as compared with those of Example 1. Thus, as shown in Table 5, the values of the ratio alibi, the ratio a2/b2 and the ratio a3/b3 were respectively different from those of Example 1, and did not satisfy the above formula (1), (2) or (3) in Comparative Example 6. It is considered that, due to this, the charge transfer resistances of the positive electrode and the negative electrode were significantly different, and thus that overvoltage was applied to the positive electrode and/or the negative electrode during the charge and discharge cycle, in the battery of Comparative Example 6. This is considered to be the reason why the battery of Comparative Example 6 exhibited a poor cycle capacity retention rate of 65%.

For example, from the comparison among the results of Examples 1 and 4, and Comparative Example 5, it can be seen that, even if positive electrodes are produced using the particles of the first positive electrode active materials having the same average particle diameter, the values of the ratio alibi, the ratio a2/b2, and the ratio a3/b3 are different depending on the production method. That is, from the results shown above, it can be seen that, even if a positive electrode is produced by incorporating the first positive electrode active material having a spinel type crystal structure in the positive electrode active material-containing layer, excellent cycle life performance cannot be realized without the idea of combining the positive electrode with the negative electrode so as to satisfy (1) $0.5 \leq a1/b1 \leq 1.5$; (2) $0.4 \leq a2/b2 \leq 1.4$; and (3) $0.5 \leq a3/b3 \leq 2.3$.

According to one or more of the embodiments and examples described above, a positive electrode is provided. This positive electrode includes a positive electrode active material-containing layer which contains a positive electrode active material. The positive electrode active material includes a first positive electrode active material having a spinel type crystal structure. This positive electrode, when combined with a negative electrode having a negative electrode active material-containing layer which contains a negative electrode active material including a first negative electrode active material having a spinel type crystal structure, satisfies the following formulas (1): $0.5 \leq a1/b1 \leq 1.5$; (2): $0.4 \leq a2/b2 \leq 1.4$; and (3): $0.5 \leq a3/b3 \leq 2.3$. This positive electrode can exhibit charge transfer resistance on a same level with the negative electrode in a nonaqueous electrolyte battery. As a result, this positive electrode can realize a nonaqueous electrolyte battery that can exhibit excellent cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode comprising:
a positive electrode active material-containing layer which contains a positive electrode active material comprising a first positive electrode active material having a spinel type crystal structure, a weight proportion of the first positive electrode active material having a spinel type crystal structure in a weight of the positive electrode active material being 75% by weight or more and 100% by weight or less, the positive electrode satisfying the following formulas (1) to (3) when combined with a negative electrode comprising a negative electrode active material-containing layer which contains a negative electrode active material comprising a first negative electrode active material having a spinel type crystal structure:

$$0.5 \leq a1/b1 \leq 1.5 \qquad (1);$$

$$0.4 \leq a2/b2 \leq 1.4 \quad (2); \text{ and}$$

$$0.5 \leq a3/b3 \leq 2.3 \quad (3),$$

provided that, in the above formulas (1) to (3), a1 is a pore volume [mL/g] per 1 g weight of the positive electrode active material-containing layer by mercury intrusion porosimetry; a2 is a pore specific surface area [m2/g] of the positive electrode active material-containing layer by the mercury intrusion porosimetry; and a3 is a median diameter [μm] in a pore distribution of the positive electrode active material-containing layer by the mercury intrusion porosimetry;

b1 is a pore volume [mL/g] per 1 g weight of the negative electrode active material-containing layer by mercury intrusion porosimetry; b2 is a pore specific surface area [m2/g] of the negative electrode active material-containing layer by the mercury intrusion porosimetry; and b3 is a median diameter [μm] in a pore distribution of the negative electrode active material-containing layer by the mercury intrusion porosimetry.

2. The positive electrode according to claim 1, wherein the positive electrode active material-containing layer contains particles of the positive electrode active material and particles of a conductive agent, and shows a particle size distribution by a laser diffraction scattering method in which a particle diameter D10 is 0.1 μm or more and 2 μm or less, a particle diameter D50 is 0.3 μm or more and 4 μm or less, and a particle diameter D90 is 3 μm or more and 10 μm or less.

3. The positive electrode according to claim 1, wherein the median diameter a3 is 0.01 μm or more and 0.3 μm or less.

4. An electrode group comprising:

a positive electrode comprising a positive electrode active material-containing layer which contains a positive electrode active material comprising a first positive electrode active material having a spinel type crystal structure, a weight proportion of the first positive electrode active material having a spinel type crystal structure in a weight of the positive electrode active material being 75% by weight or more and 100% by weight or less; and a negative electrode comprising a negative electrode active material-containing layer which contains a negative electrode active material comprising a first negative electrode active material having a spinel type crystal structure, a weight proportion of the first negative electrode active material having a spinel type crystal structure in a weight of the negative electrode active material being 75% by weight or more and 100% by weight or less, the electrode group satisfying the following formulas (1) to (3):

$$0.5 \leq a1/b1 \leq 1.5 \quad (1);$$

$$0.4 \leq a2/b2 \leq 1.4 \quad (2); \text{ and}$$

$$0.5 \leq a3/b3 \leq 2.3 \quad (3),$$

provided that, in the above formulas (1) to (3), a1 is a pore volume [mL/g] per 1 g weight of the positive electrode active material-containing layer by mercury intrusion porosimetry; a2 is a pore specific surface area [m2/g] of the positive electrode active material-containing layer by the mercury intrusion porosimetry; and a3 is a median diameter [μm] in a pore distribution of the positive electrode active material-containing layer by the mercury intrusion porosimetry; and b1 is a pore volume [mL/g] per 1 g weight of the negative electrode active material-containing layer by mercury intrusion porosimetry; b2 is a pore specific surface area [m2/g] of the negative electrode active material-containing layer by the mercury intrusion porosimetry; and b3 is a median diameter [μm] in a pore distribution of the negative electrode active material-containing layer by the mercury intrusion porosimetry.

5. The electrode group according to claim 4, wherein the median diameter a3 is 0.01 μm or more and 0.3 μm or less, and wherein the median diameter b3 is 0.01 μm or more and 0.3 μm or less.

6. The electrode group according to claim 4, further comprising a separator arranged between the positive electrode active material-containing layer and the negative electrode active material-containing layer, wherein a median diameter c3 [μm] in a pore distribution of the separator by mercury intrusion porosimetry is larger than the median diameter a3 and the median diameter b3.

7. A nonaqueous electrolyte battery comprising:

the electrode group according to claim 4; and a nonaqueous electrolyte.

* * * * *